United States Patent
Yang

(10) Patent No.: US 12,287,978 B2
(45) Date of Patent: Apr. 29, 2025

(54) HOST DEVICE, STORAGE DEVICE, AND ELECTRONIC DEVICE

(71) Applicant: SK hynix Inc., Gyeonggi-do (KR)

(72) Inventor: Soon Yeal Yang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 18/464,289

(22) Filed: Sep. 11, 2023

(65) Prior Publication Data

US 2023/0418485 A1    Dec. 28, 2023

Related U.S. Application Data

(63) Continuation of application No. 17/752,128, filed on May 24, 2022, now Pat. No. 11,782,617.

(60) Provisional application No. 63/192,877, filed on May 25, 2021.

(30) Foreign Application Priority Data

Jun. 30, 2021  (KR) .................. 10-2021-0086013
May 17, 2022  (KR) .................. 10-2022-0060466

(51) Int. Cl.
G06F 3/06           (2006.01)

(52) U.S. Cl.
CPC .......... *G06F 3/0631* (2013.01); *G06F 3/0607* (2013.01); *G06F 3/064* (2013.01); *G06F 3/0656* (2013.01); *G06F 3/0679* (2013.01)

(58) Field of Classification Search
CPC ...... G06F 3/0631; G06F 3/0607; G06F 3/064; G06F 3/0656; G06F 3/0679

USPC ................................................ 711/170, 154
See application file for complete search history.

(56) References Cited

U.S. PATENT DOCUMENTS

| | | |
|---|---|---|
| 9,489,296 B1 | 11/2016 | Tomlin et al. |
| 11,586,385 B1* | 2/2023 | Lercari .................... G06F 1/30 |
| 2010/0268876 A1 | 10/2010 | Reid et al. |
| 2018/0018091 A1 | 1/2018 | Shin et al. |
| 2018/0081928 A1 | 3/2018 | Ushijima et al. |
| 2019/0129840 A1* | 5/2019 | Kanno .................... G06F 3/064 |
| 2019/0129862 A1 | 5/2019 | Yoshida et al. |
| 2019/0310774 A1 | 10/2019 | Oh et al. |
| 2020/0125292 A1 | 4/2020 | Byun |

(Continued)

FOREIGN PATENT DOCUMENTS

WO    2016162981 A1    10/2016

OTHER PUBLICATIONS

Office Action for the U.S. Appl. No. 17/752,147 issued by the USPTO on Jun. 6, 2023.

(Continued)

*Primary Examiner* — Than Nguyen
(74) *Attorney, Agent, or Firm* — IP & T GROUP LLP

(57) ABSTRACT

According to an embodiment of the present technology, an electronic device may include a host device including: an application requesting to write data; and a file system configured to generate, in response to the request of the application, a log regarding a property of data, and allocate a section corresponding to the data based on the log; and a storage device comprising: a memory device including a plurality of memory dies; and a memory controller configured to control the memory device to receive the data and the log of the data from the host device, and sequentially store the data in a physical zone corresponding to the section.

13 Claims, 17 Drawing Sheets

(56) References Cited

U.S. PATENT DOCUMENTS

| | | | |
|---|---|---|---|
| 2020/0393994 A1* | 12/2020 | Subbarao | G06F 3/0604 |
| 2021/0216418 A1 | 7/2021 | Han et al. | |
| 2021/0365200 A1* | 11/2021 | Alwala | G06F 3/0604 |
| 2021/0389911 A1* | 12/2021 | Reusswig | G06F 12/0891 |
| 2022/0113905 A1* | 4/2022 | Agarwal | G06F 3/0631 |
| 2022/0129163 A1 | 4/2022 | Sravan et al. | |
| 2022/0365710 A1 | 11/2022 | Golov | |

OTHER PUBLICATIONS

Notice of Allowance for the U.S. Appl. No. 17/752,147 issued by the USPTO on Dec. 4, 2023.
Office Action issued for the U.S. Appl. No. 17/752,449 issued by the USPTO on Oct. 19, 2023.
Notice of Allowance issued for U.S. Appl. No. 17/752,449 Issued by the USPTO on Feb. 6, 2024.
Office Action for U.S. Appl. No. 18/616,171 issued by the USPTO on Nov. 14, 2024.

* cited by examiner

HOST DEVICE, STORAGE DEVICE, AND ELECTRONIC DEVICE

CROSS-REFERENCE TO RELATED APPLICATION

This application is a continuation of U.S. patent application Ser. No. 17/752,128 filed on May 24, 2022, which claims benefit under U.S.C. § 119 of U.S. Provisional Patent Application No. 63/192,877, filed on May 25, 2021, Korean patent application number 10-2021-0086013, filed on Jun. 30, 2021 and Korean patent application number 10-2022-0060466, filed on May 17, 2022, the entire disclosures of which are incorporated by reference herein.

BACKGROUND

Field of Invention

The present disclosure relates to an electronic device, and more particularly, to a host device, a storage device, and an electronic device including the host device and the storage device.

Description of Related Art

A storage device converts a logical address received from a host device into a physical address and uses the physical address, and thus a logical area in the host device and a physical area of the storage device are related to each other. Accordingly, in order to improve performance of an electronic device, a new device or method capable of controlling the host device and the storage device is required.

SUMMARY

An embodiment of the present disclosure provides a host device, a storage device, and an electronic device capable of efficient management for each characteristic of data.

According to an embodiment of the present disclosure, an electronic device may include a host device including: an application requesting to write data; and a file system configured to generate, in response to the request of the application, a log regarding a property of data, and allocate a section corresponding to the data based on the log; and a storage device comprising: a memory device including a plurality of memory dies; and a memory controller configured to control the memory device to receive the data and the log of the data from the host device, and sequentially store the data in a physical zone corresponding to the section, wherein the memory controller is further configured to allocate a super block including the physical zone where the data is to be stored based on the log, and wherein the super block is determined as a first super block including a plurality of first physical zones each including one or more memory blocks in one memory die or a second super block including a plurality of second physical zones each including a portion of each of memory blocks included in different memory dies according to the log of the data.

According to an embodiment of the present disclosure, a host device may include an application requesting to write data, and a file system configured to generate, in response to the request of the application, a log regarding a property of the data, and allocate a section corresponding to the data based on the log, wherein the file system is further configured to determine a section group including the section based on the log, and wherein the section group is one or more first section groups in which any one of empty sections in the section group is allocated as a new section for the data, regardless of a section order in the first section groups; or one or more second section groups in which an empty section in the next order according to a section order in the second section groups is allocated as a new section for the data.

According to an embodiment of the present disclosure, a storage device may include a memory device including a plurality of memory dies, and a memory controller configured to receive data and a log of the data from an external host, allocate a super block in which the data is to be stored in the memory device, and control the memory device to sequentially store the data in a physical zone included in the super block, wherein the super block is determined as a first super block including a plurality of first physical zones each including one or more memory blocks in one memory die or a second super block including a plurality of second physical zones each including a portion of each of memory blocks included in different memory dies according to the log of the data.

According to an embodiment of the present disclosure, a file system may be configured to generate a log regarding a property of a data input by an user, to allocate a section corresponding to the data based on the log, and to determine a section group including the section based on the log, wherein the section group is one or more first section groups in which any one of empty sections in the section group is allocated as a new section for the data, regardless of a section order in the first section groups; or one or more second section groups in which an empty section in the next order according to a section order in the second section groups is allocated as a new section for the data.

According to an embodiment of the present disclosure, an operating method of a controller, the operating method may comprise controlling a memory device to: store first data into a first super block; and store second data into a second super block, wherein: the first super block includes plural first zones each configured by memory blocks respectively belonging to different memory planes arranged within a single die, the first zones are mapped to respective logical zones randomly allocated for the first data within a first logical zone group, the second super block includes plural second zones each configured by pages respectively belonging to different memory blocks arranged over plural dies, and the second zones are mapped to respective logical zones sequentially allocated for the second data within a second logical zone group.

The present technology provides a host device, a storage device, and an electronic device capable of efficient management for each characteristic of data.

DETAILED DESCRIPTION

Specific structural or functional descriptions of embodiments according to the concept which are disclosed in the present specification are illustrated only to describe the embodiments according to the concept of the present disclosure. The embodiments according to the concept of the present disclosure may be carried out in various forms and should not be construed as being limited to the embodiments described in the present specification.

Figure 1:
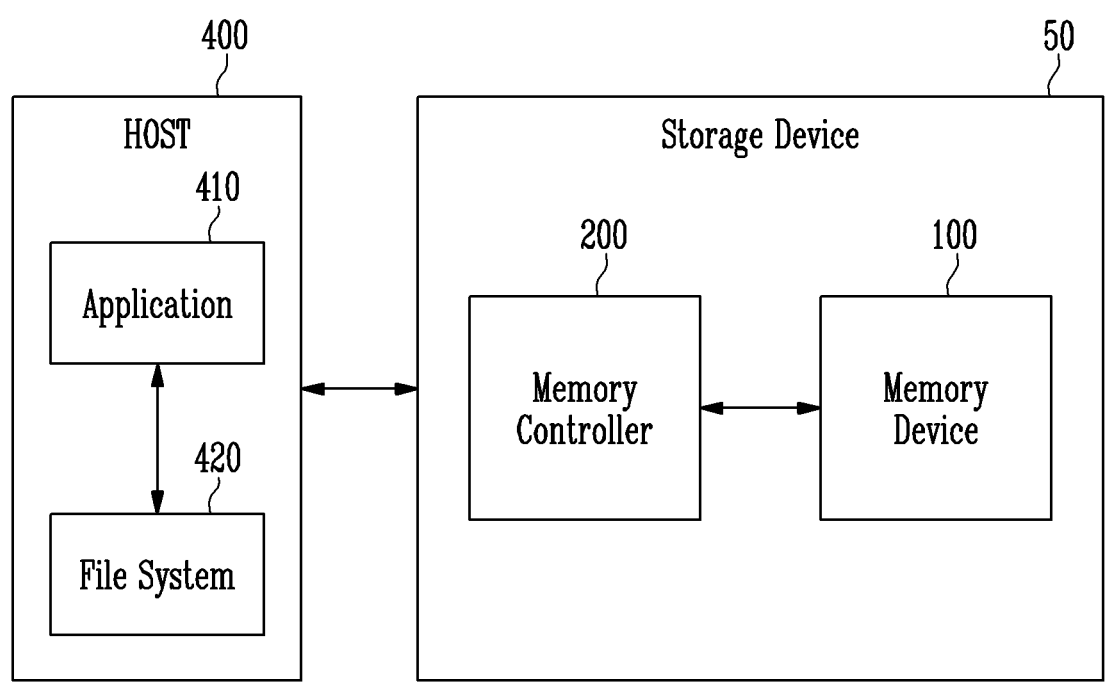
FIG. 1 is a diagram illustrating an electronic device according to an embodiment of the present disclosure.

FIG. 1 is a diagram illustrating an electronic device according to an embodiment of the present disclosure.

Referring to FIG. 1, the storage device 50 may include a memory device 100 and a memory controller 200. The storage device 50 may be a device that stores data under control of a host 400 such as a cellular phone, a smartphone, an MP3 player, a laptop computer, a desktop computer, a game player, a TV, a tablet PC, or an in-vehicle infotainment system. Alternatively, the storage device 50 may be a device that stores data under control of the host 400 that stores high-capacity data in one place, such as a server or a data center.

The storage device 50 may be manufactured as one of various types of storage devices according to a host interface that is a communication method with the host 400. For example, the storage device 50 may be configured as one of various types of storage devices such as an SSD, a multimedia card in a form of an MMC, an eMMC, an RS-MMC and a micro-MMC, a secure digital card in a form of an SD, a mini-SD and a micro-SD, a universal serial bus (USB) storage device, a universal flash storage (UFS) device, a personal computer memory card international association (PCMCIA) card type storage device, a peripheral component interconnection (PCI) card type storage device, a PCI express (PCI-e or PCIe) card type storage device, a compact flash (CF) card, a smart media card, and a memory stick.

The storage device 50 may be manufactured as one of various types of packages. For example, the storage device 50 may be manufactured as one of various package types, such as a package on package (POP), a system in package (SIP), a system on chip (SOC), a multi-chip package (MCP), a chip on board (COB), a wafer-level fabricated package (WFP), and a wafer-level stack package (WSP).

The memory device 100 may store data. The memory device 100 operates under control of the memory controller 200. The memory device 100 may include a memory cell array (not shown) including a plurality of memory cells that store data.

Each of the memory cells may be configured as a single level cell (SLC) that stores one data bit, a multi-level cell (MLC) that stores two data bits, a triple level cell (TLC) that stores three data bits, or a quad level cell (QLC) capable of storing four data bits The memory cell array (not shown) may include a plurality of memory blocks. Each memory block may include a plurality of memory cells. Each memory block may include a plurality of pages. In an embodiment, the page may be a unit for storing data in the memory device 100 or reading data stored in the memory device 100. The memory block may be a unit for erasing data.

In an embodiment, the memory device 100 may be a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change RAM (PRAM), a magnetoresistive random access memory (MRAM), a ferroelectric random access memory (FRAM), a spin transfer torque random access memory (STT-RAM), or the like. In the present specification, for convenience of description, the memory device 100 is a NAND flash memory.

The memory device 100 is configured to receive a command and an address from the memory controller 200 and access an area selected by the address in the memory cell array. The memory device 100 may perform an operation instructed by the command on the area selected by the address. For example, the memory device 100 may perform a write operation (program operation), a read operation, and an erase operation. During the program operation, the memory device 100 may program data in the area selected by the address. During the read operation, the memory device 100 may read data from the area selected by the address. During the erase operation, the memory device 100 may erase data stored in the area selected by the address.

The memory controller 200 may control an overall operation of the storage device 50.

In an embodiment, the memory controller 200 may receive data and a logical address (LA) from the host 400, and the memory controller 200 may include a firmware (not shown) capable of converting the LA into a physical address (PA) indicating an address of memory cells to which data included in the memory device 100 is to be stored. In addition, the memory controller 200 may store a logical-physical address mapping table configuring a mapping relationship between the LA and the PA in a buffer memory.

The memory controller 200 may control the memory device 100 to perform the program operation, the read operation, or the erase operation according to a request of the host 400. During the program operation, the memory controller 200 may provide a program command, the PA, and data to the memory device 100. During the read operation, the memory controller 200 may provide a read command and the PA to the memory device 100. During the erase operation, the memory controller 200 may provide an erase command and the PA to the memory device 100. Alternatively, the memory controller 200 may open or close a physical zone in the memory device 100 according to a request of the host 400. Opening the physical zone may be generating a map table for a logical address group corresponding to a corresponding physical zone, for example, LAs corresponding to a section allocated with respect to data by the host. Closing the physical zone may indicate that a write request storing data in a corresponding physical zone does not exist until an open request is received again with respect to the physical zone. The host 400 may provide a request to open or close such a physical zone as a separate request, or may provide the request together with another request such as a write request.

In an embodiment, the memory controller 200 may generate a command, an address, and data independently regardless of the request from the host 400 and transmit the command, the address, and the data to the memory device 100. For example, the memory controller 200 may provide the command, the address, and the data for performing the program operation, the read operation, and the erase operation accompanying in performing wear leveling, read reclaim, garbage collection, and the like, to the memory device 100.

In an embodiment, the memory controller 200 may include a flash translation layer. The flash translation layer may convert the LA corresponding to the request received from the host 400 into the physical address PA and output the PA to the memory device 100.

For example, as described above, the flash translation layer may convert a LA corresponding to a program request into the PA, or convert a LA corresponding to a read request into the PA, or convert a LA corresponding to an erase request into the PA. The flash translation layer may output the converted PA to the memory device 100, and the memory device 100 may perform an operation on a page or a memory block corresponding to the PA.

In an embodiment, the memory controller 200 may receive LAs from a file system 420 and convert the received LAs into successive PAs. When the successive PAs are output to the memory device 100, the memory device 100 may perform successive operations corresponding to the successive PAs. At this time, the successive PAs may be determined according to a type of an allocated physical zone. The type of the physical zone is described in more detail with reference to FIGS. 4, 12, and 13.

In an embodiment, the storage device 50 may further include the buffer memory (not shown). The memory controller 200 may control data exchange between the host 400 and the buffer memory (not shown). Alternatively, the memory controller 200 may temporarily store system data for control of the memory device 100 in the buffer memory.

For example, the memory controller 200 may temporarily store data input from the host 400 in the buffer memory, and then transmit the data temporarily stored in the buffer memory to the memory device 100.

In various embodiments, the buffer memory may be used as an operation memory and a cache memory of the memory controller 200. The buffer memory may store codes or commands executed by the memory controller 200. Alternatively, the buffer memory may store data processed by the memory controller 200.

In an embodiment, the buffer memory may be implemented as a dynamic random access memory (DRAM) such as a double data rate synchronous dynamic random access memory (DDR SDRAM), a DDR4 SDRAM, a low power double data rate4 (LPDDR4) SDRAM, a graphics double data rate (GDDR) SDRAM, a low power DDR (LPDDR) or a Rambus dynamic random access memory (RDRAM), or a static random access memory (SRAM).

In various embodiments, the buffer memory may be connected from an outside of the storage device 50. In this case, volatile memory devices connected to the outside of the storage device 50 may serve as buffer memories.

In an embodiment, the memory controller 200 may control at least two or more memory devices 100. In this case, the memory controller 200 may control the memory devices 100 according to an interleaving method to improve operation performance. The interleaving method may be a method of controlling operations for at least two memory devices 100 to overlap with each other. Alternatively, the interleaving method may be a method of controlling operations on a plurality of groups divided within one memory device 100 to overlap. At this time, a group may be one or more memory die units or one or more memory plane units.

The host 400 may communicate with the storage device 50 using at least one of various communication standards or interfaces such as a universal serial bus (USB), a serial AT attachment (SATA), a serial attached SCSI (SAS), a high speed interchip (HSIC), a small computer system interface (SCSI), a peripheral component interconnection (PCI), a PCI express (PCIe), a nonvolatile memory express (NVMe), a universal flash storage (UFS), a secure digital (SD), a multi-media card (MMC), an embedded MMC (eMMC), a dual in-line memory module (DIMM), a registered DIMM (RDIMM), and a load reduced DIMM (LRDIMM).

In an embodiment, the host 400 may include an application 410. The application 410 may be also referred to as an application program, and may be software executed on an operating system (OS). The application 410 may process data in response to a user input. For example, the application 410 may process data in response to the user input, and transmit a request for storing the processed data in the memory device 100 of the storage device 50 to the file system 420.

The file system 420 may allocate a LA to which data is to be stored, in response to the request transmitted from the application. In an embodiment, the file system 420 may be a log structure file system (LFS). The LFS may generate a log in consideration of a property of input data, and allocate a section corresponding to data based on the log. At this time, the section may be a set of LAs. Therefore, allocation of the section may mean that LAs corresponding to corresponding data are allocated. The data to which the section is allocated may be sequentially stored in a storage area of the memory device 100 corresponding to the section. For example, the LFS may be a flash friendly file system (F2FS). The F2FS may be a log-based file system designed in consideration of a characteristic of a solid state drive (SSD), and may increase an internal parallelism of the SSD by using a multi-head log. Different sections may be allocated to data for which different logs are generated. The LFS may not overwrite data. When the LFS corrects data, the LFS may newly allocate a LA corresponding to data to be corrected and write the data to a physical zone corresponding thereto.

Data requested to be written by the application 410 may be stored in a host memory (not shown) in the host, and may be flushed to the storage device 50 according to a request from the application by a device interface (not shown). The host memory may include volatile memories such as a DRAM, an SDRAM, a DDR SDRAM, an LPDDR SDRAM, and a GRAM or nonvolatile memories such as an FRAM, a ReRAM, an STT-MRAM, and a PRAM.

Figure 2:
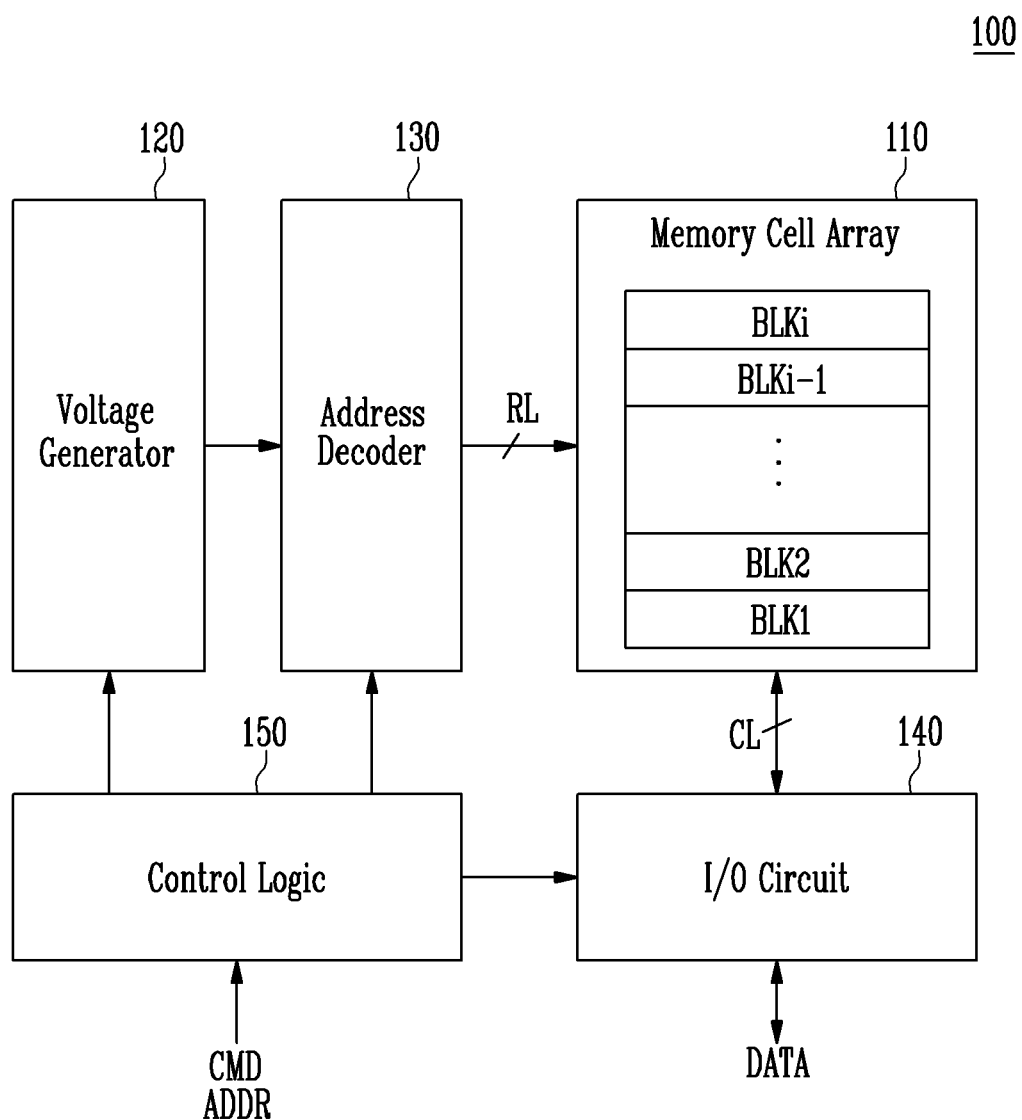
FIG. 2 is a diagram illustrating a memory device of FIG. 1 according to an embodiment of the present disclosure.

FIG. 2 is a diagram illustrating the memory device of FIG. 1 according to an embodiment of the present disclosure.

Referring to FIG. 2, the memory device 100 may include a memory cell array 110, a voltage generator 120, an address decoder 130, an input/output circuit 140, and a control logic 150.

The memory cell array 110 includes a plurality of memory blocks BLK1 to BLKi. The plurality of memory blocks BLK1 to BLKi are connected to the address decoder 130 through row lines RL. The plurality of memory blocks BLK1 to BLKi may be connected to the input/output circuit 140 through column lines CL. In an embodiment, the row lines RL may include word lines, source select lines, and drain select lines. In an embodiment, the column lines CL may include bit lines.

In an embodiment, the memory cell array 110 may include one or more memory dies, and each memory die may include one or more planes including one or more memory blocks.

In addition, the plurality of memory blocks BLK included in the memory cell array 110 may be grouped into two or more super blocks (SBs). The SB may be a unit in which the control logic 150 manages the plurality of memory blocks BLK included in the memory cell array 110. One SB may be a set of memory blocks BLK on which the read operation, the write operation, and/or the like are/is performed simultaneously or in the same time period, the read operation, the write operation, and/or the like are/is performed in conjunction with or in relation to each other, a set of memory blocks BLK on which the read operation, the write operation, and/or the like are/is performed with respect to one command, or a set of memory blocks BLK on which the read operation, the write operation, and/or the like are/is performed in conjunction with each other or simultaneously. In addition, a group of memory blocks BLK distinguished from each other in terms of management or an operation among the plurality of memory blocks BLK may be referred to as the SB. All sizes of each of two or more SBs may be the same. That is, all numbers of memory blocks BLK included in each of the two or more SBs may be the same. Alternatively, a size of at least one of the two or more SBs may be different from that of the remaining SB. That is, the number of memory blocks BLK included in at least one SB among the plurality of SBs may be different from the number of memory blocks BLK included in the remaining SB. In addition, all of the two or more memory blocks BLK included in each of the two or more SBs may be positioned in the same memory die. Alternatively, the two or more memory blocks BLK included in each of the two or more SBs may be positioned in two or more different memory dies.

Each of the plurality of memory blocks BLK1 to BLKi includes a plurality of memory cells. In an embodiment, the plurality of memory cells may be nonvolatile memory cells. Memory cells connected to the same word line among the plurality of memory cells may be defined as one physical page. That is, the memory cell array 110 may include a plurality of physical pages. Each of the memory cells of the memory device 100 may be configured as a single level cell (SLC) that stores one data bit, a multi-level cell (MLC) that stores two data bits, a triple level cell (TLC) that stores three data bits, or a quad level cell (QLC) capable of storing four data bits.

In an embodiment, the voltage generator 120, the address decoder 130, and the input/output circuit 140 may be collectively referred to as a peripheral circuit. The peripheral circuit may drive the memory cell array 110 under control of the control logic 150. The peripheral circuit may drive the memory cell array 110 to perform the program operation, the read operation, and the erase operation.

The voltage generator 120 is configured to generate a plurality of operation voltages using an external power voltage supplied to the memory device 100. The voltage generator 120 operates in response to the control of the control logic 150.

In an embodiment, the voltage generator 120 may generate an internal power voltage by regulating the external power voltage. The internal power voltage generated by the voltage generator 120 is used as an operation voltage of the memory device 100.

In an embodiment, the voltage generator 120 may generate the plurality of operation voltages using an external power voltage or an internal power voltage. The voltage generator 120 may be configured to generate various voltages required in the memory device 100. For example, the voltage generator 120 may generate a plurality of erase voltages, a plurality of program voltages, a plurality of pass voltages, a plurality of selected read voltages, and a plurality of unselected read voltages.

The voltage generator 120 may include a plurality of pumping capacitors that receive the internal power voltage to generate the plurality of operation voltages having various voltage levels, and may generate the plurality of operation voltages by selectively activating the plurality of pumping capacitors in response to the control of the control logic 150.

The generated plurality of operation voltages may be supplied to the memory cell array 110 by the address decoder 130.

The address decoder 130 is connected to the memory cell array 110 through the row lines RL. The address decoder 130 is configured to operate in response to the control of the control logic 150. The address decoder 130 may receive an address ADDR from the control logic 150. The address decoder 130 may decode a block address among the received addresses ADDR. The address decoder 130 selects at least one memory block among the memory blocks BLK1 to BLKi according to the decoded block address. The address decoder 130 may decode a row address among the received addresses ADDR. The address decoder 130 may select at least one word line among word lines of a selected memory block according to the decoded row address. In an embodiment, the address decoder 130 may decode a column address among the received addresses ADDR. The address decoder 130 may connect the input/output circuit 140 and the memory cell array 110 to each other according to the decoded column address.

For example, the address decoder 130 may include components such as a row decoder, a column decoder, and an address buffer.

The input/output circuit 140 may include a plurality of page buffers. The plurality of page buffers may be connected to the memory cell array 110 through the bit lines. During the program operation, data may be stored in selected memory cells according to data stored in the plurality of page buffers.

During the read operation, the data stored in the selected memory cells may be sensed through the bit lines, and the sensed data may be stored in the page buffers.

The control logic 150 may control the address decoder 130, the voltage generator 120, and the input/output circuit 140. The control logic 150 may operate in response to the command CMD transmitted from an external device. The control logic 150 may generate control signals in response to the command CMD and the address ADDR to control the peripheral circuits.

Figure 3:
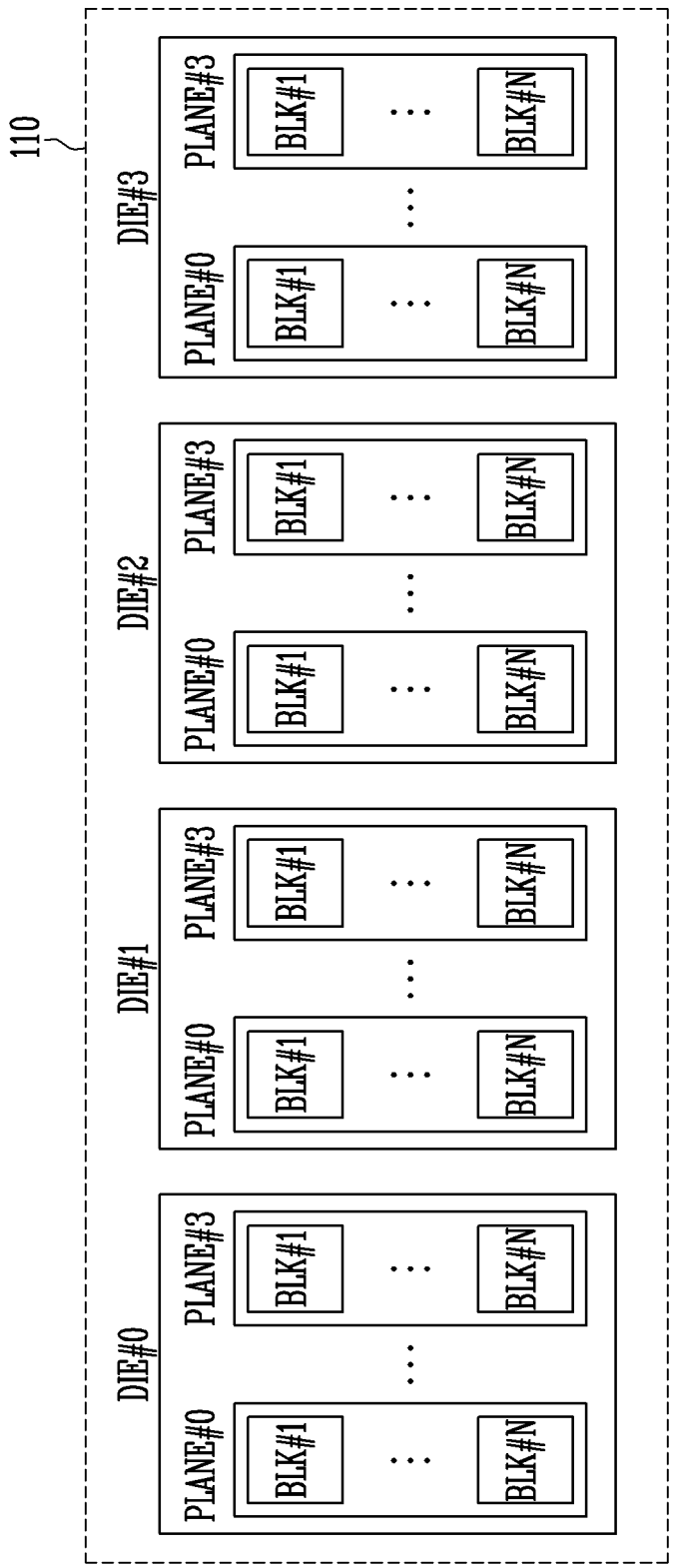
FIG. 3 is a diagram illustrating a memory cell array of FIG. 2 according to an embodiment of the present disclosure.

FIG. 3 is a diagram illustrating the memory cell array of FIG. 2 according to an embodiment of the present disclosure.

Referring to FIG. 3, the memory cell array 110 may include one or more memory dies, and each memory die may include one or more planes including one or more memory blocks. In FIG. 3, the memory cell array 110 includes four memory dies DIE#0, DIE#1, DIE#2, and DIE#3, but the number of memory dies is not limited thereto. The plurality of memory dies may perform transmission and reception with the memory controller through a plurality of channels, and each channel may be connected to one or more memory dies. For example, when one channel is connected to one memory die, one memory die may receive one command at a time, and the planes included in one memory die may process commands received by the memory die in parallel.

Figure 4:
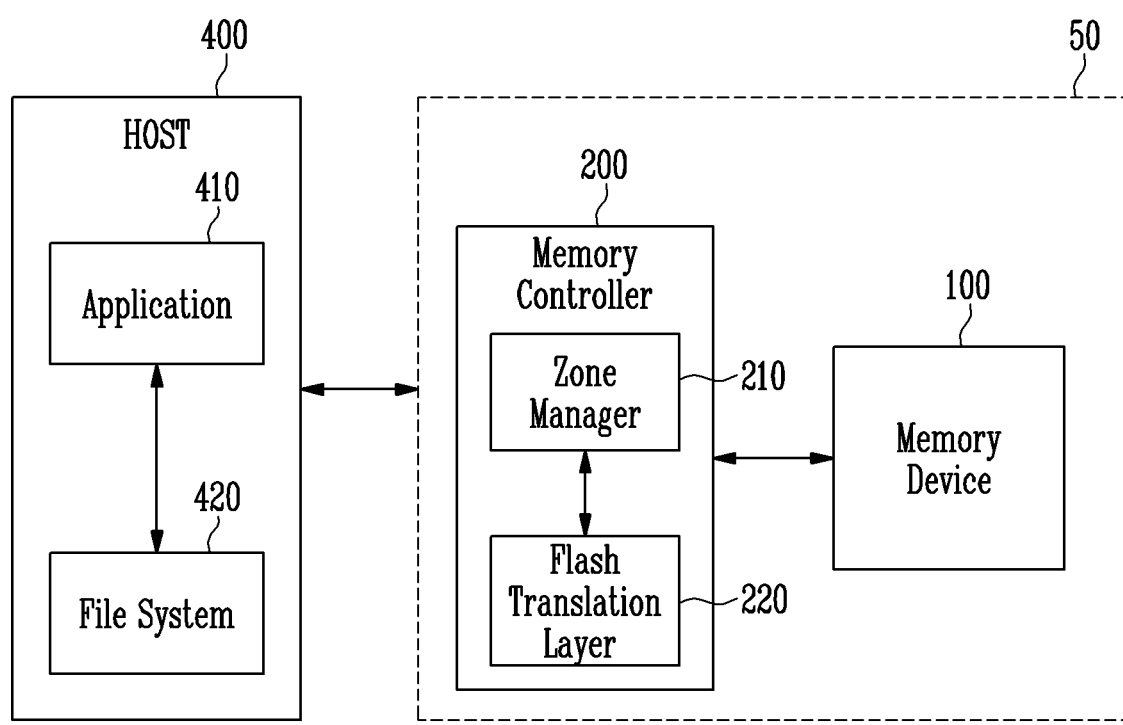
FIG. 4 is a diagram illustrating section allocation in a host device and physical zone allocation in a storage device according to an embodiment of the present disclosure.

FIG. 4 is a diagram illustrating section allocation in a host device and physical zone allocation in a storage device according to an embodiment of the present disclosure.

Referring to FIG. 4, the file system 420 of the host device may generate a log for a property of data in response to a request from the application 410 requesting to write data, and allocate a section corresponding to the data based on the log. The section may be a group of a plurality of LAs, and allocating the section corresponding to the data may mean allocating some or all of the plurality of LAs included in the section to the corresponding data. In an embodiment, the plurality of LAs corresponding to one section may be successive LAs. Alternatively, the plurality of LAs corresponding to one section may not be successive, but information on the LAs included in each section may be stored in a memory in the host, a memory on the storage device, or the like, and the LA for each section may be managed. In addition, the file system 420 may determine a section group including the section based on the log allocated to the data. The section group may include a plurality of sections, and LAs included in sections in one section group may be successive. Alternatively, the LAs included in the sections in one section group may not be successive, but information on the LAs included in each section group may be stored in the memory in the host, the memory on the storage device, or the like, and the LA for each section group may be managed. In an embodiment, the section group may include a first section group in which the file system allocates one of empty sections in the section group as a new section regardless of a section order in the section group, and a second section group in which the file system allocates the new section according to the section order in the section group.

In addition, the host 400 may provide the storage device with the data to which the log and the section are allocated by the file system 420. In an example, the data may be provided to the storage device 50 through a device interface (not shown) in the host 400. The file system 420 may divide the memory device 100 in the storage device 50 into a plurality of areas and manage the memory device 100. In an embodiment, the file system 420 may divide a storage space in the memory device 100 into a check point area, a segment information table (Segment Info. Table, SIT), a node address table (NAT), a segment summary area (SSA), and a main area. The check point area may store a checkpoint. The checkpoint may be data that preserves a state up to a logical breakpoint of a system when a system stop event such as a sudden power off occurs during an operation of a computing system, and data may be recovered using the checkpoint. The SIT may include valid page information in each segment. The NAT may include an identifier for each node configuring an indexing tree of a file stored in the memory device 100 and a PA corresponding to each node identifier. The SSA may include summary information of each segment of the main area to be described later. The main area may be a space for storing various pieces of directory information, data, file information, and the like used by an actual user. In the present specification, all data and information stored in the main area are defined as data. At this time, the data stored in the main area may be classified into a node or data according to a type thereof. The node may mean an inode or index, and the data may mean a directory or user file data. In addition, the stored data may be classified according to a temperature, and the temperature of the data may be classified into hot, warm, and cold, respectively. Accordingly, the data may be classified into a hot node, a warm node, a cold node, hot data, warm data, cold data, and the like by the file system 420, and may be stored in the main area after the log is allocated. Therefore, the main area may be divided into virtual zones corresponding to the sections allocated by the file system 420, and a specific log may be allocated to each of the virtual zones. In addition, the virtual zones may be grouped and divided into virtual zone groups corresponding to the section group determined by the file system 420. In addition, each of the virtual zones may include a plurality of segments, and data may be sequentially stored in each segment. At this time, one segment may correspond to one or two or more LAs. The virtual zones may be physically implemented in a host memory (not shown) in the host or a buffer memory device (not shown) of the storage device, or physically implemented by managing information on LAs included for each section and section group in the host memory or the buffer memory device.

The storage device 50 may include the memory controller 200 and the memory device 100, and the memory controller 200 may include a zone manager 210 and a flash translation layer 220.

The memory controller 200 may receive data and a corresponding log from the host 400. The data may be data to which the corresponding log and the section are allocated by the file system 420. The zone manager 210 may allocate an SB in which data is to be stored based on the log of the received data. The SB may include a plurality of physical zones, and a shape of the physical zone included therein is different according to a type of the SB, and thus allocating the SB may be determining the shape of the physical zone to which the data is stored. That is, it may be determined which physical zone is required to be included in a first physical zone including one or more memory blocks in one memory die and a second physical zone including a portion of each of the memory blocks included in different memory dies. At this time, an SB including a plurality of first physical zones may be referred to as a first SB, and an SB including a plurality of second physical zones may be referred to as a second SB. At this time, the data stored in the first SB may be data to which the section in the first section group is allocated by the file system 420, and the data stored in the second SB may be data to which the section in the second section group is allocated.

The zone manager 210 may provide information on the type of the physical zone in which data is to be stored to the flash translation layer 220, and the flash translation layer 220 may convert the LA of the data to which the section is allocated into the PA, based on the information on the type of the physical zone in which the data is to be stored. In an embodiment, the LAs included in the section may be assigned to the data to which the section is allocated, and the flash translation layer 220 may convert the LA of the data to be stored into successive PAs in the physical zone determined by the zone manager 210.

The flash translation layer 220 may transmit the converted PA to the zone manager 210, and the zone manager 210 may control the memory device 100 to store the data in the received physical address.

Figure 5:
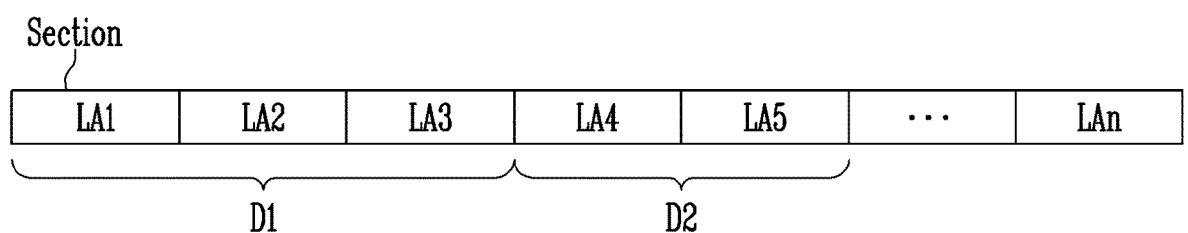
FIG. 5 is a diagram illustrating a structure of a section allocated by a file system according to an embodiment of the present disclosure.

FIG. 5 is a diagram illustrating a structure of the section allocated by the file system according to an embodiment of the present disclosure.

Referring to FIG. 5, the section may include a plurality of LAs. The LAs included in one section may be successive addresses or non-successive addresses. Allocation of the section to data may mean that the LA in the section is allocated. Information on the addresses included in each section may be included in the memory in the host or the memory in the storage device. The LA may be sequentially allocated according to a size of data of which writing is requested. For example, when a write request for data D1 and D2 of a specific size exists, and the sections of FIG. 5 are allocated to both of the data D1 and D2, LAs of LA1 to LA3 may be allocated to D1, and LAs of LA4 and LA5 may be allocated to D2.

Figure 6:
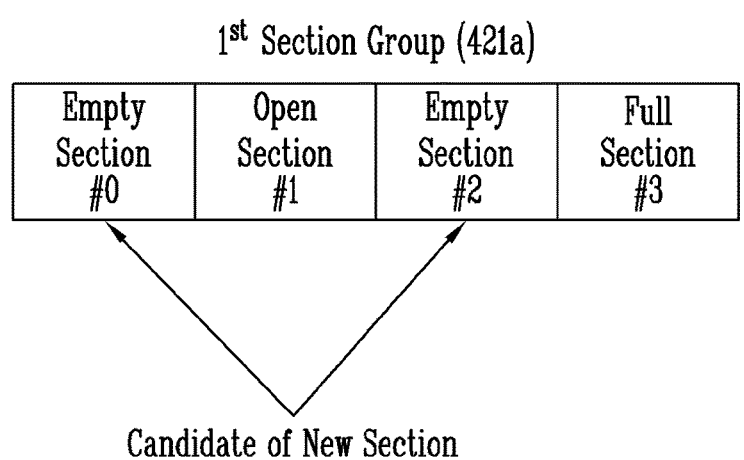
FIG. 6 is a diagram illustrating a process of allocating a new section of a first section group according to an embodiment of the present disclosure.

FIG. 6 is a diagram illustrating a process of allocating a new section of a first section group according to an embodiment of the present disclosure.

Referring to FIG. 6, a section group to which a new section may be allocated regardless of the section order in the section group may be defined as a first section group 421a. At this time, LAs included in the sections in the section group may be successive with each other, and as the number of sections in the section group increases, the LA may increase. Therefore, the section order may mean a section number order in the section group, which may mean an order in a direction in which the LA increases. Alternatively, the LAs included in the sections in the section group may not be successive with each other. In this case, the section order may be determined based on information on a section stored in a separate memory and LAs included for each section group. In a case of the first section group 421a, since the section is allocated and the LA may be allocated regardless of the section order, a third section Section #3 may be allocated first and all LAs in the third section may be assigned. Therefore, after a full section, a first section Section #1 may be allocated and the LA for new data may be allocated. When all LAs of the first section, which are open sections, are assigned to the data and the first section becomes the full section, the file system 420 may allocate one of a 0-th section Section #0 or a second sections Section #2 which is an empty section as a new section and assign a LA included therein to the data.

Figure 7A:
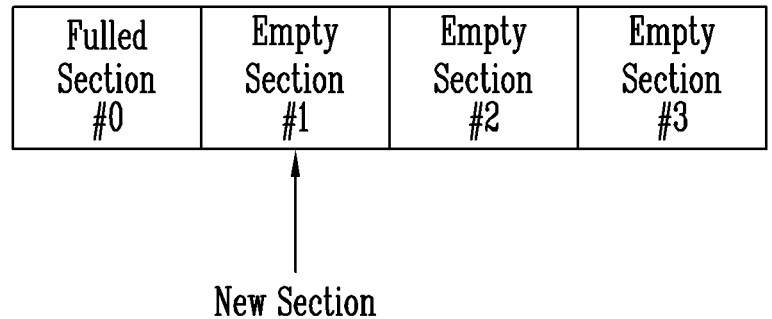
FIGS. 7A and 7B are diagrams illustrating a process of allocating a new section of a second section group according to an embodiment of the present disclosure.
Figure 7B:
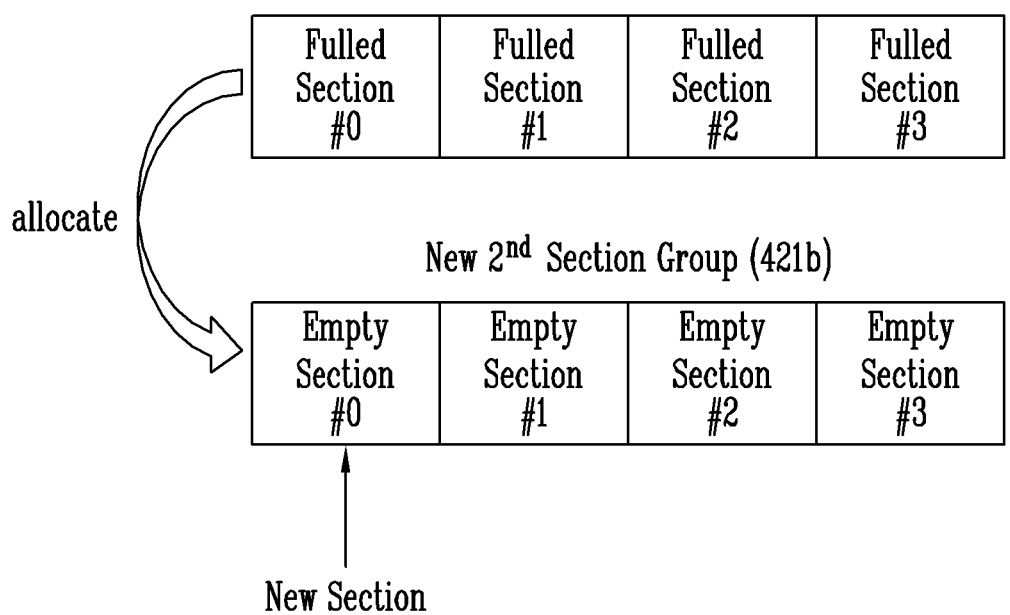

FIGS. 7A and 7B are diagrams illustrating a process of allocating a new section of a second section group according to an embodiment of the present disclosure.

Referring to FIGS. 7A and 7B, a section group to which a new section may be allocated according to the section order in the section group may be defined as a second section group 412b. As shown in FIG. 7A, in the second section group, the 0-th section Section #0 may be opened first and a LA included therein may be assigned to the data, when the 0-th section becomes the full section, a first section Section #1 which is a next section may be allocated as a new section, and thus data may be stored. When all sections in the second section group 421b are the full sections as shown in FIG. 7B, after the file system 420 allocates the new second section group 421b, the file system 420 may allocate the section Section #0 which is a first section in the new second section group 421b and assign an LA included therein to the data. At this time, in a case of the second section group 421b, since the section is allocated according to the section order in the section group, and when the third section Section #3 which is a last section is the full section, the empty section may not exist among sections prior thereto. Therefore, in a case of the second section group 421b, the empty section in the section group is required to be found, and when a section of a next section in the second section group 421b does not exist, the file system 420 allocates a new second section group 421b.

Figure 8:
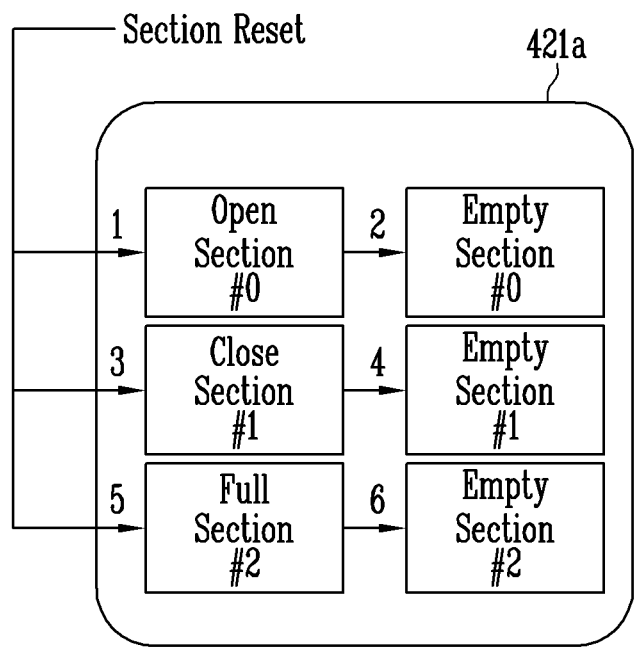
FIG. 8 is a diagram illustrating a reset process of a first section group according to an embodiment of the present disclosure.

FIG. 8 is a diagram illustrating a reset process of a first section group according to an embodiment of the present disclosure.

Referring to FIG. 8, in the first section group 421a, 1) when resetting the 0-th section Section #0, 2) as all data corresponding to the LAs in the 0-th section are discarded, the 0-th section may become the empty section, and thus a reset operation is completed. In addition, 3) when resetting the first section Section #1, 4) as all data corresponding to the LAs in the first section are discarded, the first section may become the empty section, and thus the reset operation may be completed. In addition, 5) when resetting the second section Section #2, 6) as all data corresponding to the LAs in the second section are discarded, the second section may become the empty section, and thus the reset operation may be completed. That is, when the reset operation is performed on one section included in the first section group 421a, data corresponding to the LAs in a corresponding section may be discarded in response thereto, the corresponding section may become the empty section immediately, and thus the reset operation may be completed. At this time, discarding the data corresponding to the LAs may mean releasing a mapping relationship between the LA and the data. The reset operation may be performed when all data corresponding to the LAs in a specific section are invalid, and when valid data exists, the valid data may be mapped to a LA of another section, and data corresponding to the LA may be invalidated, and then the reset operation may be performed. The LAs included in the section of which reset is completed may be re-assigned to new data. The reset operation may be performed by the file system.

Figure 9:
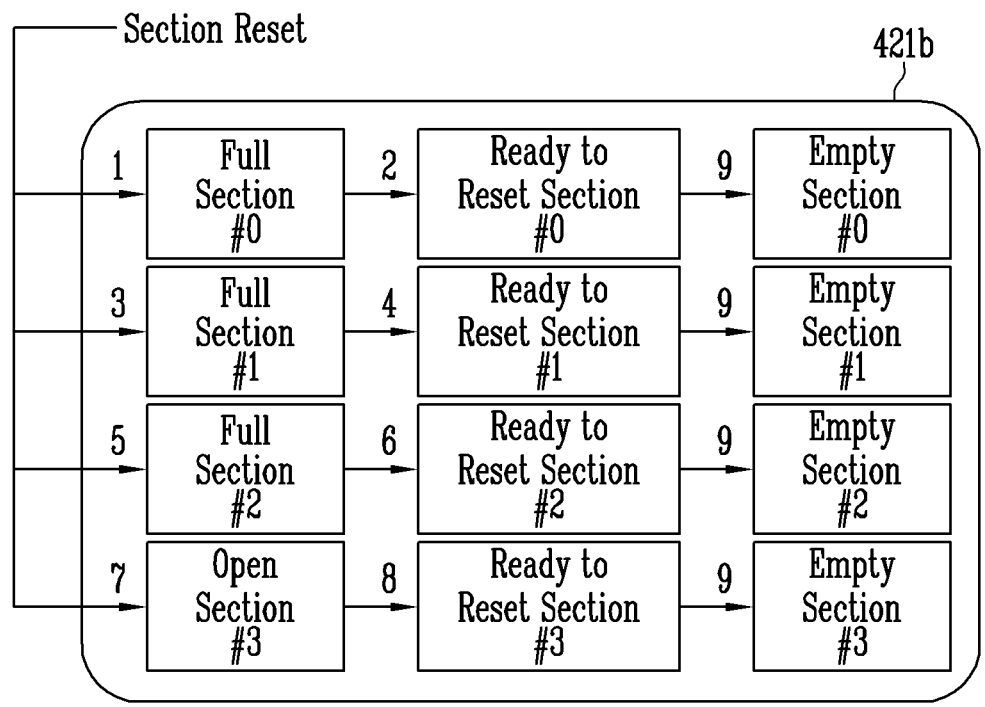
FIG. 9 is a diagram illustrating a reset process of a second section group according to an embodiment of the present disclosure.

FIG. 9 is a diagram illustrating a reset process of a second section group according to an embodiment of the present disclosure.

Referring to FIGS. 4 and 9, in the second section group 421b, 1) when resetting the 0-th section Section #0, 2) the data corresponding to the LAs in the 0-th section are not immediately discarded, information indicating that the 0-th section is ready to reset (Ready to Reset Zone) is stored in a bitmap. In addition, 3) when resetting the first section Section #1, 4) the data corresponding to the LAs in the first section are not immediately discarded, and information indicating that the first section is ready to reset (Ready to Reset Zone) is stored in the bitmap. In addition, 5) when resetting the second section Section #2, 6) the data corresponding to the LAs in the second section are not immediately discarded, and information indicating that the second section is ready to reset (Ready to Reset Zone) is stored in the bitmap. In addition, 7) when resetting the third section Section #3, 8) the data corresponding to the LAs in the third section are not immediately discarded, and information indicating that the third section is ready to reset (Ready to Reset Zone) is stored in the bitmap. 9) Accordingly, when the information indicating that all sections of the second section group 421b is ready to reset is stored in the bitmap, all data corresponding to all LAs in all sections may be discarded, all sections in the second section group 421b may become empty sections at once, and thus the reset operation may be completed. That is, in a case of the second section group 421b, when only some sections are reset, the data may not be immediately discarded and the section may not become the empty section, but all sections in the second section group 421b may become the empty sections simultaneously by discarding the data corresponding to the LAs of all sections included in the second section group 421b after the information indicating that all sections are ready to reset is stored. When the reset operation is completed, the information indicating that all sections in the second section group 421b are ready to reset may be deleted. Herein, the bitmap storing the information indicating that all sections in the second section group 421b are ready to reset may be included in an arbitrary position in the storage device. Herein, discarding the data corresponding to the LAs may mean releasing the mapping relationship between the LA and the data. The reset operation may be performed when all data corresponding to the LAs in a specific section are invalid, and when valid data exists, the valid data may be mapped to a LA of another section, and data corresponding to the LA may be invalidated, and then the reset operation may be performed. The LAs included in the section of which reset is completed may be re-assigned to new data. The reset operation may be performed by the file system.

Figure 10:
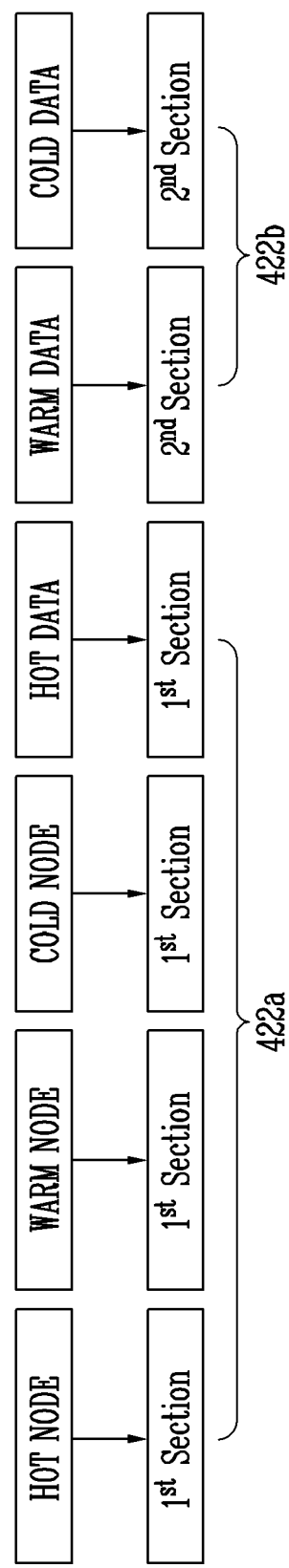
FIG. 10 is a diagram illustrating classification of data according to an embodiment of the present disclosure.

FIG. 10 is a diagram illustrating classification of data according to an embodiment of the present disclosure.

In an embodiment, data requested to be written by the application may be classified into the node or the data according to the type thereof, and may be classified into hot, warm, and cold according to the temperature. Accordingly, the file system 420 may generate the log of a hot node, a warm node, a cold node, hot data, warm data, cold data, or the like with respect to the data according to the property thereof. For example, the hot node may be an inode or direct node block for a directory, and the hot node may be data of which an overwrite or update frequency is very high and a probability in which the data become an object of garbage collection may also be high. The worm node may be an inode or direct node block for a regular file, and the worm node may be data of which the overwrite or update frequency is high and a probability in which the data becomes the object of the garbage collection is significant. The cold node may be an indirect node block, and the cold node may be data in which the overwrite and update frequency is low but a probability in which the data becomes the object of the garbage collection is very high. The hot data may be a directory entry block, quota, or file data of a relatively small capacity of 64 KB or less, and the hot data may be data in which the overwrite or update frequency is high compared to another data and a probability in which the data becomes the object of the garbage collection is high. The worm data may be a data block created by a user, and may be file data of a relatively large capacity of, for example, 64 KB or more. The worm data may be data in which the update frequency is relatively high and a probability in which the data becomes the object of the garbage collection is relatively low. The cold data may be data moved by cleaning or garbage collection, a data block classified as the cold data by the user, or file data having a specific format (ex, .db, .jpg, or the like), for example, may be multimedia file data, and the cold data may be data in which the overwrite frequency is low and a probability in which the data becomes the object of the garbage collection is relatively low. However, the classification of such data is not limited to such a method, and may be modified in a method having various criteria including a method in FIG. 11 below. In the present specification, the cleaning of the file system may mean releasing the relationship between the LAs in a victim section and data corresponding thereto after allocating another section to valid data corresponding to the LA in the victim section in order to secure the empty section from the host's point of view. The garbage collection may mean erasing a corresponding physical zone after moving the valid data among the data stored in the victim physical zone of the memory device to another physical zone.

Referring to FIG. 10, the section included in the first section group may be allocated to the hot node, the warm node, the cold node, and the hot data, and the section included in the second section group may be allocated to the warm data and the cold data. At this time, the hot node, the warm node, the cold node, and the hot data to which the first section included in the first section group is allocated may be defined as first type data, the warm data and the cold data to which the second section included in the second section group is allocated may be defined as second type data. However, the classification of each data included in the first section group and the second section group is not limited to that shown in FIG. 10, and the data may be variously classified according to settings. Preferably, the first type data may be data having a relatively small capacity or having a high probability in which the data is updated or overwritten. In addition, the second type data may be data having a relatively large capacity or having a low possibility in which the data is updated or overwritten. Accordingly, the second type data may be data that is more affected by input/output performance than the first type data. At this time, the data classified as the first type data may be allocated to the sections in one first section group regardless of a specific property thereof. Alternatively, even though the same first type data, when the properties such as the data type (the node, or the data) or the temperature (hot, warm, cold) are different, sections in a plurality of different first section groups may be allocated accordingly. Similarly, the sections within one second section group may be allocated to the data classified as the second type data regardless of the specific property thereof. Alternatively, even though the same second type data, when properties such as the data type (the node, or the data) or the temperature (hot, warm, cold) are different, sections in a plurality of different second section groups may be allocated accordingly.

Figure 11:
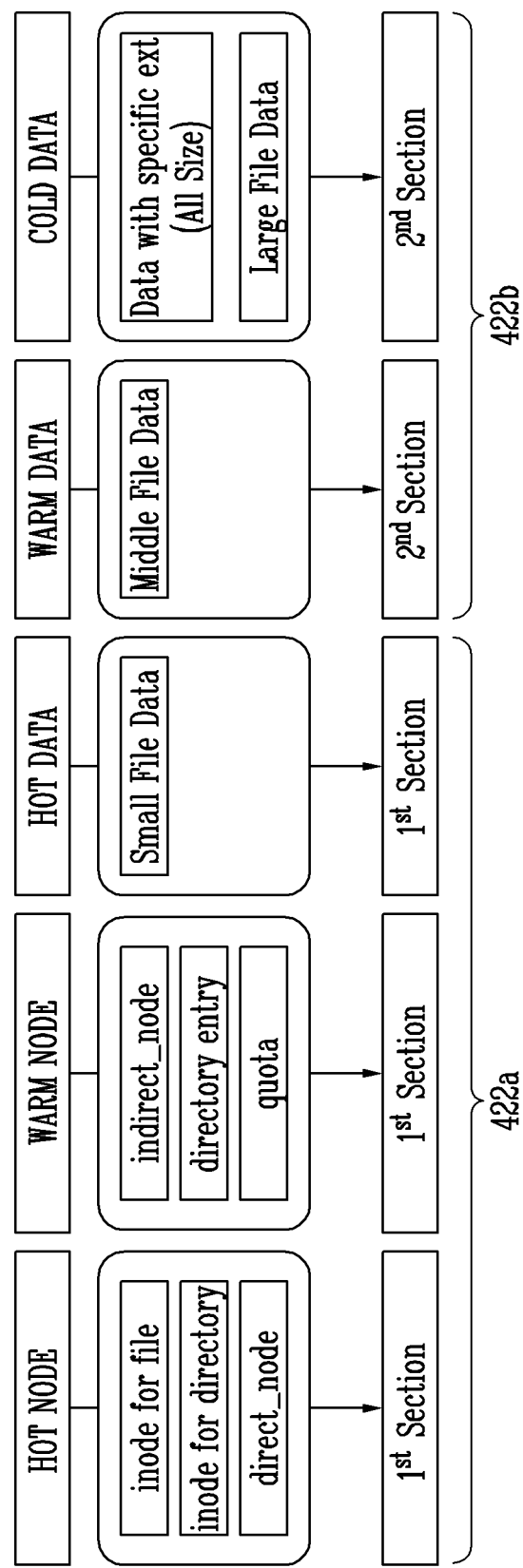
FIG. 11 is a diagram illustrating classification of data according to another embodiment of the present disclosure.

FIG. 11 is a diagram illustrating classification of data according to another embodiment of the present disclosure.

Referring to FIG. 11, data may be classified according to a classification criterion different from that of FIG. 10. In a case of FIG. 11, data is classified into a hot node, a warm node, hot data, warm data, and cold data. The hot node may include an inode for a directory, an inode for a file, and a direct node, and the warm node may include an indirect node, a directory entry block, and a quota. In addition, the hot data may include small-sized file data, the warm data may include medium-sized file data, and the cold data may be large-sized file data or file data of all sizes having a specific format. That is, the classification of the data presented in FIG. 11 may be a reclassification of data of various properties based on the type of the data, the size of the data, a data occurrence frequency, an overwrite frequency, and the like so that dividing and managing the section group and the SBs are more suitable. Accordingly, the hot node, the warm node, and the hot data classified according thereto may be classified as the first type data, and the sections in the first section group may be allocated to the hot node, the warm node, and the hot data, and the warm data and the cold data may be classified as the second type data, and the sections in the second section group may be allocated to the warm data and the cold data. However, the data classification criterion is not limited to the contents described with reference to FIG. 10 and the contents shown in FIG. 11.

Figure 12:
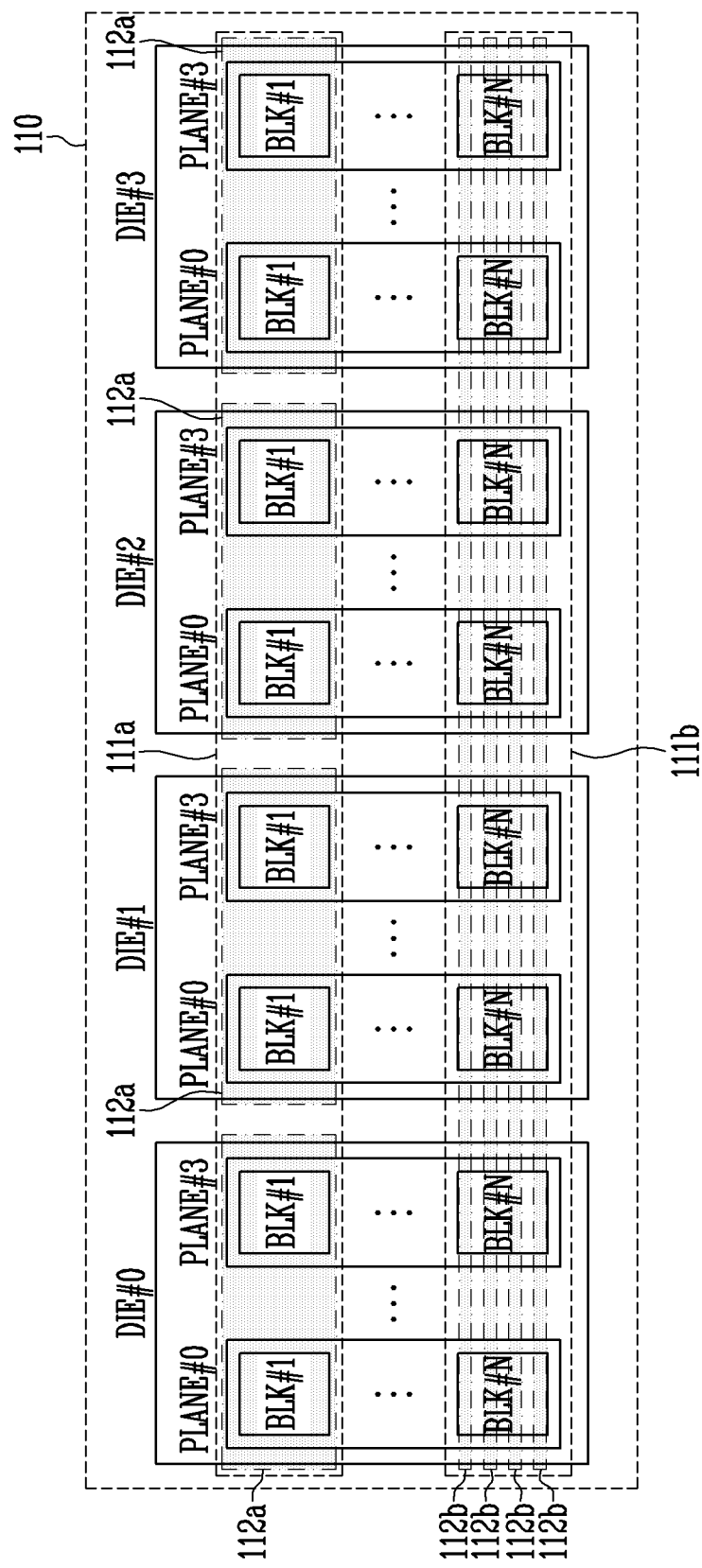
FIG. 12 is a diagram illustrating memory block management of a storage device according to an embodiment of the present disclosure.

FIG. 12 is a diagram illustrating memory block management of a storage device according to an embodiment of the present disclosure.

Referring to FIGS. 3, 4, and 12, the memory cell array 110 may include a plurality of memory dies, for example, four memory dies DIE#0 to DIE#3. In addition, each memory die may include a plurality of planes each including a plurality of memory blocks, for example, four planes PLANE#0 to PLANE#3. The zone manager 210 may classify and manage the plurality of memory blocks in the memory cell array as the SB. The SB may include one or more physical zones. The SB may be formed over the plurality of memory dies, for example, as shown in FIG. 12, the SB may be formed over all memory dies. The SB may be classified into a first SB 111a and a second SB 111b according to the shape of the included physical zone.

In a case of a first physical zone 112a included in the first SB 111a, one or more blocks in one memory die may be included. For example, as shown in FIG. 12, a zone including one memory block included in planes 0 to 3 for each memory die may be designated as one physical zone, and thus the first SB 111a may include four first physical zones 112a formed one per die.

A second physical zone 112b included in the second SB 111b may include a portion of each of blocks included in different memory dies. For example, as shown in FIG. 12, the second physical zone 112b may be formed over the entire four memory dies DIE#0 to DIE#3, and may include only a portion of each of the memory blocks included in each plane. For example, as shown in FIG. 12, only ¼ of pages of each memory block included in each plane may be included. Accordingly, the second SB 111b may include four second physical zones 112b formed over the entire memory dies and formed to include only a partial page of each memory block.

In an embodiment, sizes of the first SB 111a and the second SB 111b may be the same. That is, the first SB 111a and the second SB 111b may include the same number of memory blocks. In addition, sizes of the first physical zone 112a and the second physical zone 112b may be the same. That is, the number of pages included in the first physical zone 112a and the second physical zone 112b may be the same. The first physical zone 112a may be formed in one memory die, but the second physical zone 112b may be formed over the plurality of memory dies. Accordingly, in a case of the second physical zone 112b, an operation may be possible in a die interleaving method. In particular, when the second physical zone 112b is formed over the entire memory die as shown in FIG. 12, an operation is possible in a full-die interleaving method. However, different second physical zones 112b may not be allocated and programmed simultaneously. In addition, since the second physical zone includes only a portion of each of the memory blocks, a specific physical zone may not be immediately erased when the specific physical zone is required to be erased. When the entire page of each of the memory blocks partially included in the corresponding physical zone may be erased, that is, when the entire physical zone of the SB including the corresponding physical zone may be erased, the corresponding physical zone may be erased. Accordingly, in a case of the second physical zone, an advantage that an operation is possible in an interleaving method in a memory die unit, but storing data having a high input/output frequency may be unsuitable in consideration of a limitation during programming and erasure. Accordingly, performance improvement of the electronic device may be expected by using both of the first SB and the second SB in storing data having a relatively small capacity or a high input/output frequency in the first physical zone in the first SB and storing data having a relatively large capacity or a low input/output frequency in the second physical zone in the second SB.

Figure 13:
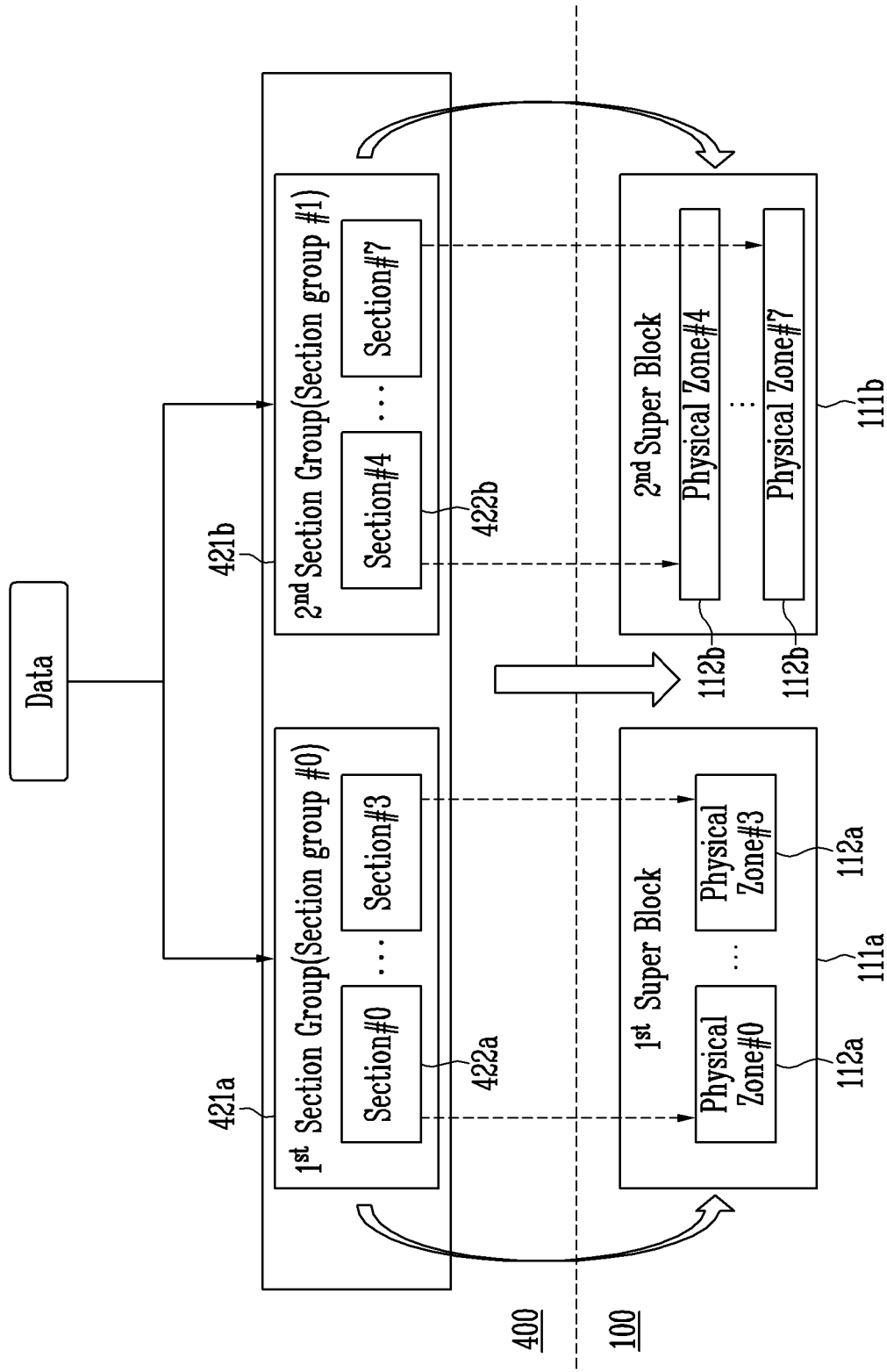
FIG. 13 is a diagram illustrating a memory block management process of an electronic device according to an embodiment of the present disclosure.

FIG. 13 is a diagram illustrating a memory block management process of an electronic device according to an embodiment of the present disclosure.

Referring to FIGS. 4, 12, and 13, the file system 420 of the host 400 generates the log based on the property of the data with respect to the data requested to be written by the application 410, classifies the data based on the log, and determines the section group including the section to allocate to the data. According to various criteria, data may be divided into the first type data to which the first section 422a of the first section group 421a is allocated and the second type data to which the second section 422b of the second section group 421b is allocated. The data to which the first section 422a in the first section group 421a is allocated by the file system may be stored in the first physical zone 112a in the first SB 111a of the memory device 100, and the data to which the second section 422b in the second section group 421b is allocated may be stored in the second physical zone 112b in the second SB 111b of the memory device 100, according to control of the memory controller 200. The first section group 421a corresponds to the first SB 111a, and thus the first section 422a corresponds to the first physical zone 112a. A characteristic of the first section 422a to which the new section may be allocated regardless of the section order in the section group matches a characteristic of the first physical zone 112a managed for each memory die, and both of the first section and the first physical zone have the same characteristics that the reset or erase operation is possible one section or physical zone unit. In addition, the property of the second section 422b for allocating the new section according to the section order in the section group matches the property of the second physical zone 112b formed over the plurality of memory dies, and both of the second section and the second physical have the same characteristics that the reset or erase operation is impossible in one section or physical zone unit, the reset or erase operation is performed after both of the second section group and the second SB to which each belongs is in a state in which the reset or erase operation is possible.

The first sections 422a in the first section group 421a may be allocated regardless of the section order. In response to a request for allocating a physical zone in which the data to which the section is allocated from the host is to be stored, the area manager 210 may allocate the first physical zone 112a formed as an area within one memory die. The second sections 422b in the second section group 422b may be allocated according to the section order. In response to the request for allocating the physical zone in which the data to which the section is allocated from the host is to be stored, the area manager 210 may allocate the second physical zone 112b formed as an area including a portion of the memory blocks in the plurality of memory dies. In response to the physical zone allocation request of the host 400, when the zone manager 210 returns information that an additionally allocable physical zone does not exist in a currently used SB, the file system 420 may allocate a new section group and then, allocate a section in the new section group. In response to this, the zone manager 210 may allocate a new SB and a new physical zone included therein, and then store data to which the new section is allocated. Alternatively, the file system 420 may allocate the new section group and the section included therein without receiving a reply for the information on the SB and the physical zone from the zone manager 210.

Figure 14:
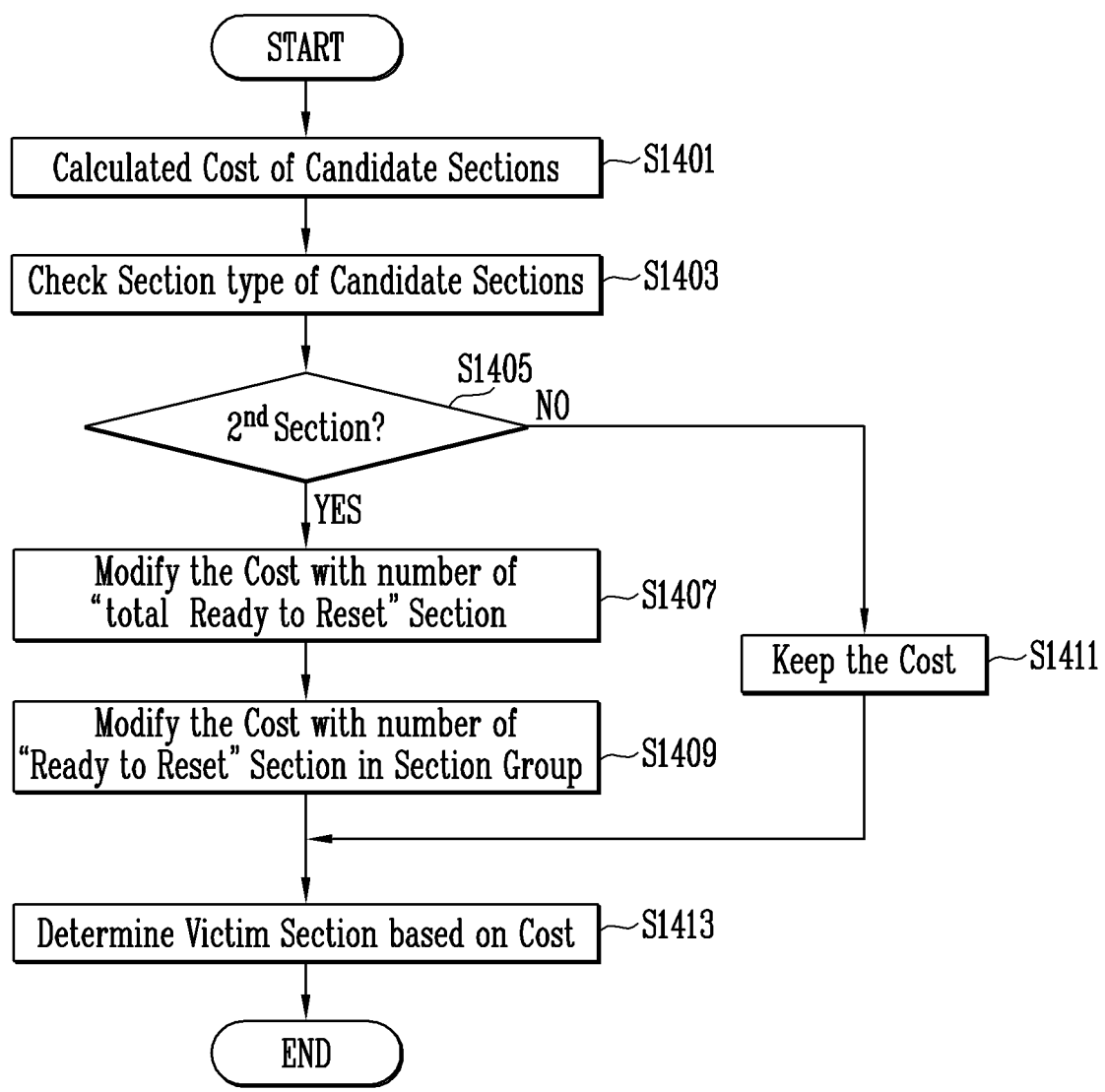
FIG. 14 is a flowchart illustrating a process of determining a victim section for cleaning, according to an embodiment of the present disclosure.

FIG. 14 is a flowchart illustrating a process of determining a victim section for cleaning, according to an embodiment of the present disclosure.

Referring to FIGS. 4 and 14, in operation S1401, a cost of candidate sections may be calculated. The cost at this time may be calculated in a method that is conventionally used for victim section selection. For example, the cost calculation may be performed in a greedy method or in a cost-benefit method. The greedy method is a method of selecting a section with the smallest number of valid blocks as the victim section by setting a cost with a smaller value as the number of valid blocks corresponding to LAs included in a section is the smallest. The cost-benefit method may set the cost value by considering both a correction time of the data corresponding to the LAs in each section and the number of valid blocks corresponding to the LAs in the section. The cost-benefit method may select a section as the victim section by giving a lower cost as the section is corrected a relatively long time ago or as the number of valid blocks in the section is small. In an embodiment, the cost of the victim section may be calculated in the greedy method in a case of foreground cleaning, and the cost of the victim section may be calculated in the cost-benefit method in a case of background cleaning.

In operation S1403, a section type of the candidate section of which the cost is calculated may be checked. That is, it may be confirmed whether the corresponding section is the first section belonging to the first section group or the second section belonging to the second section group.

In operation S1405, when it is determined that the corresponding section is not the second section, that is, when it is determined that the corresponding section is the first section, the cost calculated in operation S1401 may be maintained without changing as in operation S1411. On the other hand, in operation S1405, when it is determined that the corresponding section is the second section, the cost may be corrected based on the number of sections in which the information indicating the "Ready to Reset" is stored, as in operations S1407 and S1409. A state in which the reset operation is desired to be performed on a specific section belonging to the second section group, but the reset operation is not completed because another section that is not ready to perform the reset operation exists in the section group may be defined as a ready to reset state. At this time, the section in the ready to reset state may store information indicating this in a separate bitmap. In operation S1407, the number of all sections that are ready to reset among all sections allocated by the file system 420 may be considered. For example, when the number of sections that are ready to reset among all sections exceeds a threshold value, a probability that the candidate section included in the second section group is selected as the victim section may be increased by lowering the cost. When the number of sections that are ready to reset does not exceed the threshold value, the cost may maintain. Alternatively, different weights may be assigned according to the number of sections that are ready to reset among all sections. Alternatively, when the number of sections that are ready to reset among all sections exceeds the threshold value, the number of sections that are ready to reset in the second section group to which the corresponding section belongs may be checked in operation S1409. When the number of sections that are ready to reset among all sections does not exceed the threshold value, operation S1409 may not be performed. In operation S1409, when the number of sections that are ready to reset in the second section group to which the corresponding section belongs exceeds the threshold value, a probability that the corresponding section is selected as the victim section may be increased by lowering the cost, and when the number of sections that are ready to reset in the second section group to which the corresponding section belongs does not exceed the threshold value, the cost may be maintained. Alternatively, different weights may be assigned according to the number of sections that are ready to reset in the second section group. At this time, both of operations S1407 and S1409 may be performed or only one of the two operations may be performed.

Through the calculation and correction of the cost, in operation S1413, a final cost value may be compared and the victim section for cleaning the sections may be determined.

In an embodiment, when cleaning is performed, a next cleaning performance time point may be adjusted in consideration of a ratio of LAs corresponding to invalid data among LAs included in all sections. At this time, in a case of the second section group, since LAs included in the sections that are ready to reset are not LAs that may be assigned to new data, data corresponding to the LAs in the section that are ready to reset may be treated as invalid data, and the next cleaning performance time point may be adjusted.

Figure 15:
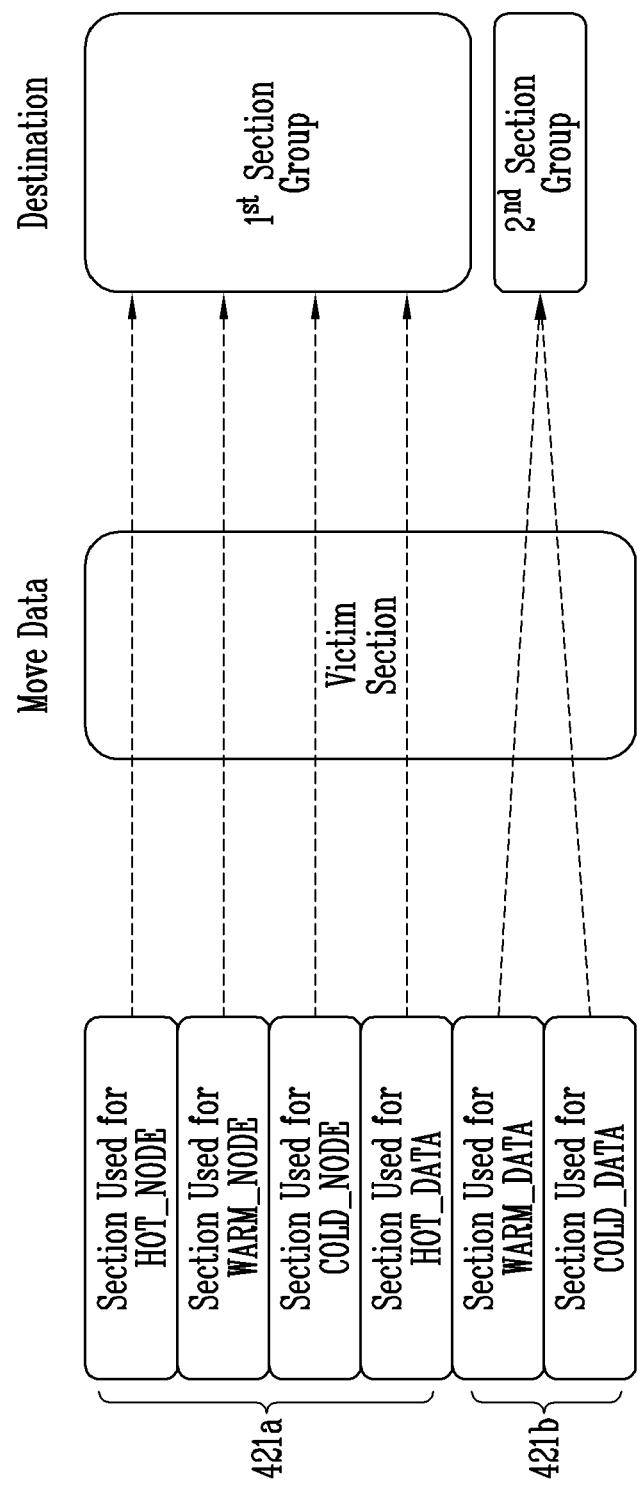
FIG. 15 is a diagram illustrating a process of allocating a new section to valid data corresponding to logical addresses in a victim section when cleaning is performed, according to an embodiment of the present disclosure.

FIG. 15 is a diagram illustrating a process of allocating a new section to valid data corresponding to LAs in a victim section when cleaning is performed, according to an embodiment of the present disclosure.

Referring to FIG. 15, when the victim section is selected through the process shown in FIG. 14, the new section may be allocated to the valid data corresponding to the LAs in the victim section. At this time, the section newly allocated to the valid data may be a section included in the section group of the same type as the section group including the previously allocated section. For example, the data classified as the first type data such as the hot node, the warm node, the cold node, and the hot data of FIG. 15, to which the first section in the first section group is allocated, is identically allocated with the first section in the first section group. When the first section to be allocated does not exist in the first section group, after allocating a new first section group, any section included therein may be allocated to the valid data corresponding to the LAs in the victim section. In addition, the data classified as the second type data such as the warm data and the cold data of FIG. 15, to which the second section in the second section group is allocated, is also allocated with the second section in the second section group. When the second section to be allocated does not exist in the second section group, after allocating a new second section group, any section included therein may be allocated to the valid data corresponding to the LAs in the victim section.

Figure 16:
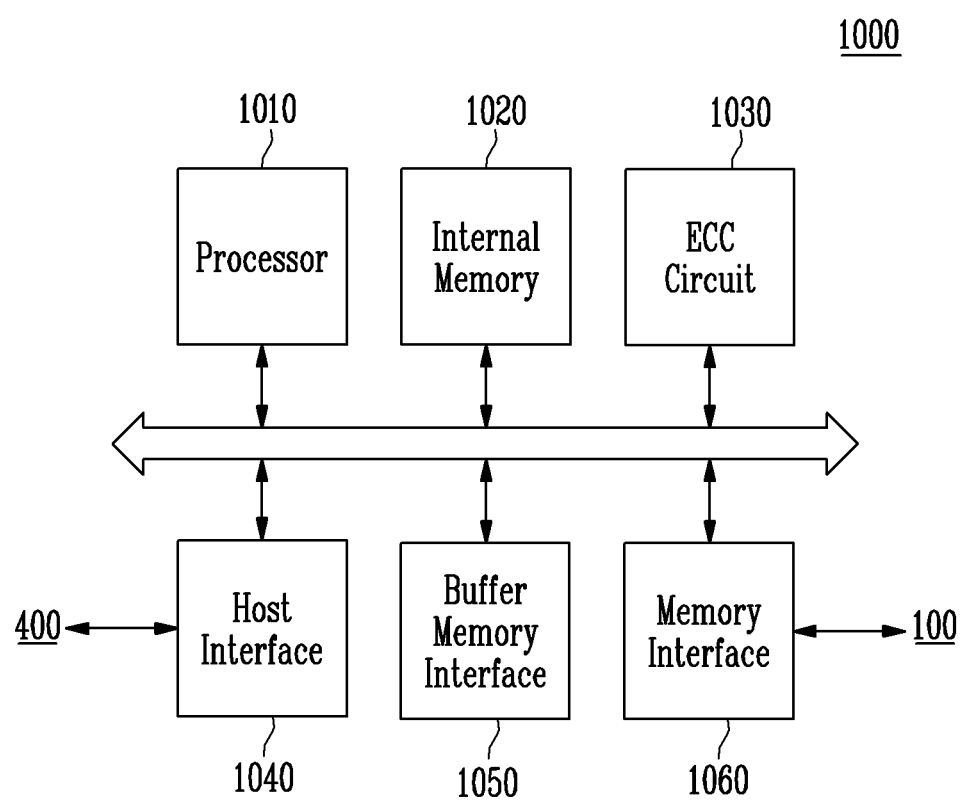
FIG. 16 is a diagram illustrating a memory controller of FIG. 1 according to an embodiment of the present disclosure.

FIG. 16 is a diagram illustrating the memory controller of FIG. 1 according to an embodiment of the present disclosure.

Referring to FIG. 16, the memory controller 1000 may include a processor 1010, an internal memory 1020, an error correction code circuit 1030, a host interface 1040, a buffer memory interface 1050, and a memory interface 1060.

The processor 1010 may perform various operations or may generate various commands for controlling the memory device 100. When receiving a request from the host 400, the processor 1010 may generate a command according to the received request and transmit the generated command to a queue controller (not shown). In addition, the processor 1010 may allocate the SB in the memory device in which the data received from the host is to be stored and the physical zone included therein, in response to the physical zone allocation request from the host 400, and manage the allocated SB and the physical zone.

The internal memory 1020 may store various pieces of information necessary for an operation of the memory controller 1000. For example, the internal memory 1020 may include logical and physical address map tables. The internal memory 1020 may be configured of at least one of a random access memory (RAM), a dynamic RAM (DRAM), a static RAM (SRAM), a cache, and a tightly coupled memory (TCM).

The error correction code circuit 1030 is configured to detect and correct an error of data received from the memory device 100 using an error correction code (ECC). The processor 1010 may adjust a read voltage according to an error detection result of the error correction code circuit 1030 and control the memory device 100 to perform re-reading. In an embodiment, an error correction block may be provided as a component of the memory controller 1000.

The host interface 1040 may exchange a command, an address, and data between the memory controller 1000 and the host 400. For example, the host interface 1040 may receive a request, an address, and data from the host 400, and may output data read from the memory device 100 to the host 400. The host interface 1040 may communicate with the host 400 using a communication standard or interface such as universal serial bus (USB), serial AT attachment (SATA), serial attached SCSI (SAS), high speed interchip (HSIC), small computer system interface (SCSI), peripheral component interconnection (PCI), PCI express (PCIe), non-volatile memory express (NVMe), universal flash storage (UFS), secure digital (SD), multimedia card (MMC), embedded MMC (eMMC), dual in-line memory module (DIMM), registered DIMM (RDIMM), load reduced DIMM (LRDIMM), enhanced small disk interface (ESDI), or integrated drive electronics (IDE). The host interface 1040 may receive the request to allocate the physical zone corresponding to the section allocated to the data by the host 400.

The buffer memory interface 1050 may transmit data between the processor 1010 and the buffer memory. By the processor 1010, the buffer memory interface 1050 may use the buffer memory as a read buffer, a write buffer, a map buffer, and the like. According to an embodiment, the buffer memory may include a double data rate synchronous dynamic random access memory (DDR SDRAM), DDR4 SDRAM, low power double data rate4 (LPDDR4) SDRAM, graphics double data rate (GDDR) SDRAM, low power DDR (LPDDR), or Rambus dynamic random access memory (RDRAM). When the buffer memory is included in the memory controller 1000, the buffer memory interface 1050 may be omitted.

The memory interface 1060 may exchange the command, the address, and the data between the memory controller 1000 and the memory device 100. For example, the memory interface 1060 may transmit the command, the address, the data, and the like to the memory device 100 and may receive the data and the like from the memory device 100 through a channel. The memory interface 1060 may transmit and receive the command, the address, and the data to and from the memory device 100 based on the SB and the physical zone allocated and managed by the processor 1010.

Figure 17:
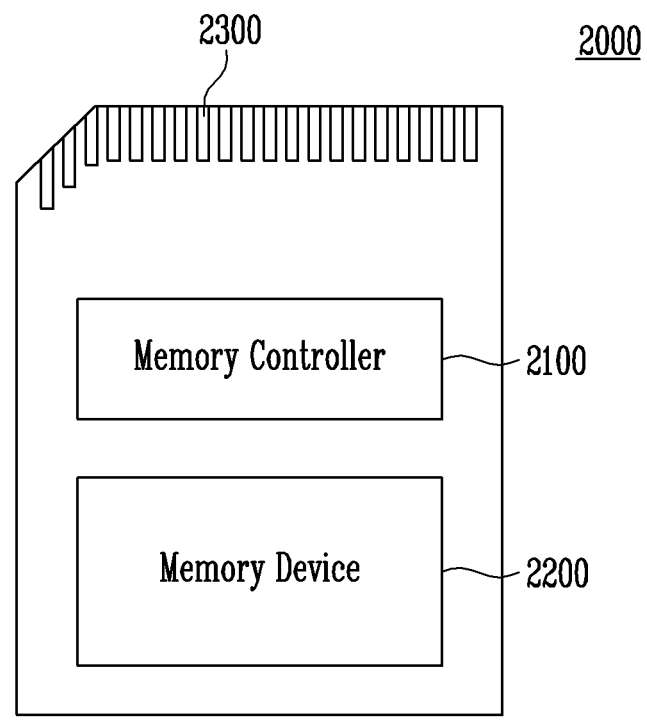
FIG. 17 is a block diagram illustrating a memory card system to which a storage device according to an embodiment of the present disclosure is applied.

FIG. 17 is a block diagram illustrating a memory card system to which a storage device according to an embodiment of the present disclosure is applied.

Referring to FIG. 17, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, program, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1. For example, the memory controller 2100 may allocate a physical zone and a super block including the same in the memory device 2200 to control the memory device 2200 in units of the physical zone and the super block.

For example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. For example, the memory controller 2100 is configured to communicate with an external device through at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe. For example, the connector 2300 may be defined by at least one of the various communication standards or interfaces described above.

For example, the memory device 2200 may be configured of various nonvolatile memory elements such as an electrically erasable and programmable ROM (EEPROM), a NAND flash memory, a NOR flash memory, a phase-change RAM (PRAM), a resistive RAM (ReRAM), a ferroelectric RAM (FRAM), and a spin transfer torque-magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (personal computer memory card international association (PCMCIA)), a compact flash card (CF), a smart media card (SM or SMC), a memory stick, a multimedia card (MMC, RS-MMC, MMCmicro, or eMMC), an SD card (SD, miniSD, microSD, or SDHC), and a universal flash storage (UFS).

Figure 18:
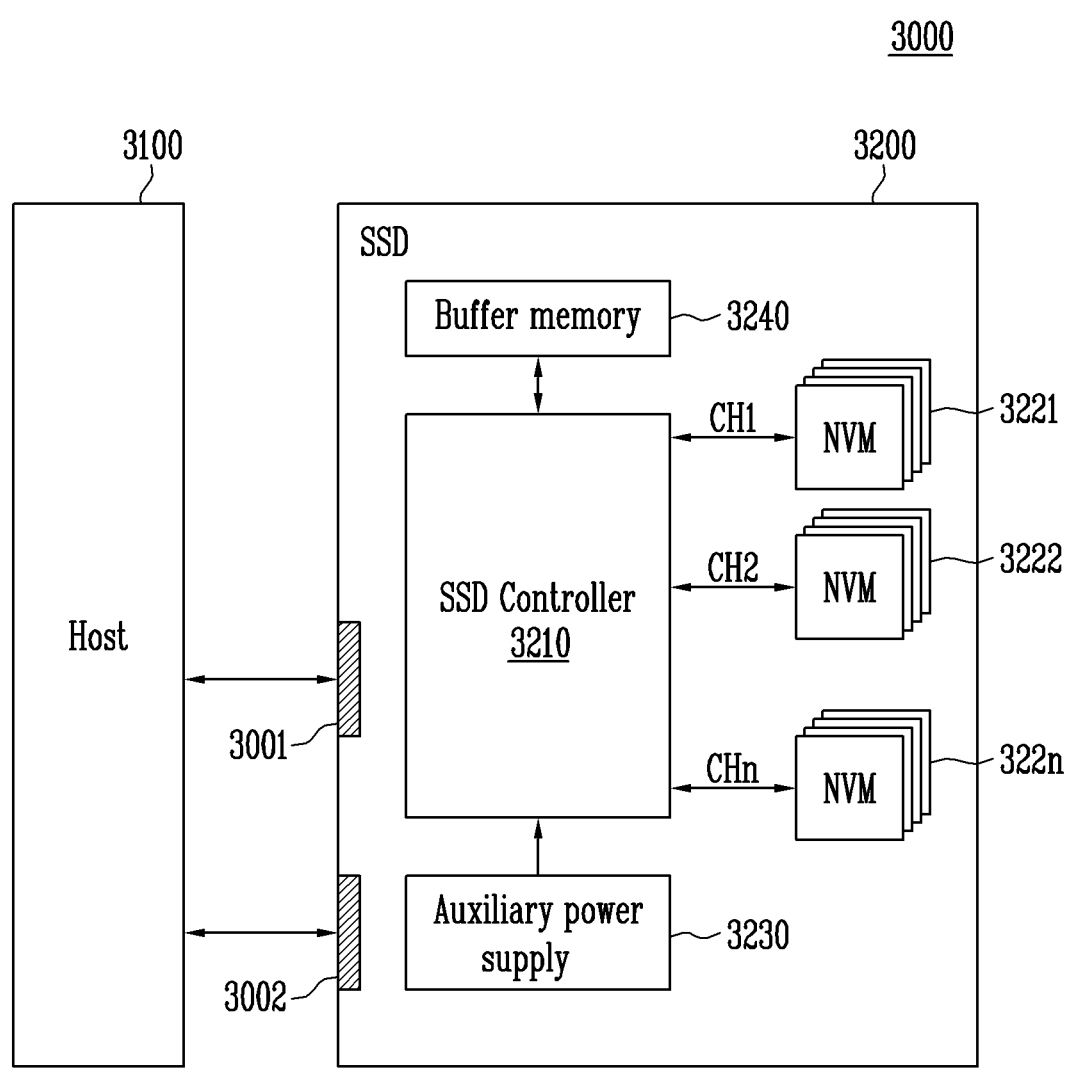
FIG. 18 is a block diagram illustrating a solid state drive (SSD) system to which a storage device according to an embodiment of the present disclosure is applied.

FIG. 18 is a block diagram illustrating a solid state drive (SSD) system to which a storage device according to an embodiment of the present disclosure is applied.

Referring to FIG. 18, the SSD system 3000 includes a host 3100 and an SSD 3200. The SSD 3200 exchanges a signal with the host 3100 through a signal connector 3001 and receives power through a power connector 3002. The SSD 3200 includes an SSD controller 3210, a plurality of flash memories 3221 to 322n, an auxiliary power supply 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal received from the host 3100. The SSD controller 3210 may control the plurality of flash memories through a plurality of channels CH1 to CHn. One or more memory dies may be connected to each channel. For example, the signal may be signals based on an interface between the host 3100 and the SSD 3200. For example, the signal may be a signal defined by at least one of various communication standards or interfaces such as a universal serial bus (USB), a multimedia card (MMC), an embedded MMC (eMMC), a peripheral component interconnection (PCI), a PCI express (PCI-e or PCIe), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, and an NVMe.

The auxiliary power supply 3230 is connected to the host 3100 through the power connector 3002. The auxiliary power supply 3230 may receive the power from the host 3100 and may charge the power. The auxiliary power supply 3230 may provide power to the SSD 3200 when power supply from the host 3100 is not smooth. For example, the auxiliary power supply 3230 may be positioned in the SSD 3200 or may be positioned outside the SSD 3200. For example, the auxiliary power supply 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store meta data (for example, a mapping table) of the flash memories 3221 to 322n. The buffer memory 3240 may include a volatile memory such as a DRAM, an SDRAM, a DDR SDRAM, an LPDDR SDRAM, and a GRAM, or a nonvolatile memory such as an FRAM, a ReRAM, an STT-MRAM, and a PRAM.

Figure 19:
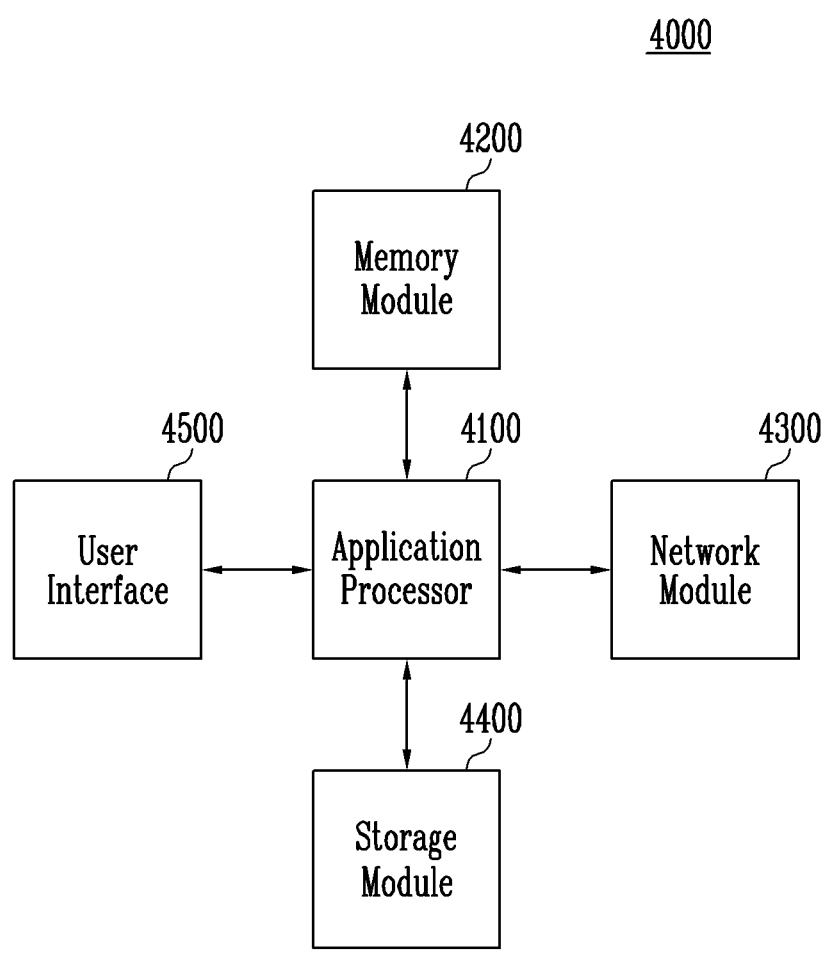
FIG. 19 is a block diagram illustrating a user system to which a storage device according to an embodiment of the present disclosure is applied.

FIG. 19 is a block diagram illustrating a user system to which a storage device according to an embodiment of the present disclosure is applied.

Referring to FIG. 19, the user system 4000 includes an application processor 4100, a memory module 4200, a network module 4300, a storage module 4400, and a user interface 4500.

The application processor 4100 may drive components, an operating system (OS), a user program, a file system, or the like included in the user system 4000. For example, the application processor 4100 may include controllers, interfaces, graphics engines, and the like that control the components included in the user system 4000. The application processor 4100 may be provided as a system-on-chip (SoC). The application processor 4100 may generate a log for data requested by a user to write, allocate a section group and a section based thereon, and provide the data to which the section is allocated to the storage module 4400.

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a nonvolatile random access memory, such as a PRAM, a ReRAM, an MRAM, and an FRAM. For example, the application processor 4100 and memory module 4200 may be packaged based on a package on package (POP) and provided as one semiconductor package.

The network module 4300 may communicate with external devices. For example, the network module 4300 may support wireless communication such as code division multiple access (CDMA), global system for mobile communications (GSM), wideband CDMA (WCDMA), CDMA-2000, time division multiple access (TDMA), long term evolution, WiMAX, WLAN, UWB, Bluetooth, and Wi-Fi. For example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. For example, the storage module 4400 may be implemented with a nonvolatile semiconductor memory element such as a phase-change RAM (PRAM), a magnetic RAM (MRAM), a resistive RAM (RRAM), a NAND flash, a NOR flash, and a three-dimensional NAND flash. For example, the storage module 4400 may be provided as a removable storage device (removable drive), such as a memory card, and an external drive of the user system 4000.

For example, the storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or an instruction to the application processor 4100 or for outputting data to an external device. For example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

Although the technical idea of the present disclosure has been specifically described according to the above embodiments, it should be noted that the aforementioned embodiments are for the purpose of description and are not for limitation thereof. Furthermore, one of ordinary skill in the technical field of the present disclosure will appreciate that various embodiments can be made within the technical idea of the present disclosure and the following claims. Moreover, the embodiments may be combined to form additional embodiments.

What is claimed is:

1. A host device in communication with a storage device including a controller and a memory device controlled by the controller, the host device comprising:
   an application configured to generate a write request to store first data in the memory device including a plurality of memory dies; and
   a file system configured to:
   generate, in response to the write request, a log of the first data, and
   allocate a first section group among a plurality of section groups and a first section among a plurality of sections included in the first section group for the first data based on the log,
   wherein the first section group is an indicator used by the controller to determine a superblock included in the memory device in which the first data is to be stored, and
   wherein the first section is an indicator used by the controller to determine a physical zone in which the first data is to be stored among a plurality of physical zones included in the superblock.

2. The host device of claim 1, wherein the first data has a larger size than a predetermined size or a lower input/output frequency than a predetermined frequency.

3. The host device of claim 2, wherein the application requests generates a write request to store second data in the memory device, and the second data has a smaller size than the predetermined size or a higher input/output frequency than the predetermined frequency.

4. The host device of claim 3, wherein the file system generates a log of the second data.

5. The host device of claim 4, wherein the file system allocates a second section included in a second section group among the plurality of section groups for the second data based on the log of the second data.

6. The host device of claim 5, wherein the log of the first data and the log of the second data represent types and temperatures of the first data and the second data, respectively.

7. The host device of claim 1, wherein an empty section in the next order according to a section order in the first section group is allocated as a new section for the first data.

8. The host device of claim 5, wherein any one of empty sections in the second section group is allocated as a new section for the second data, regardless of a section order in the second section group.

9. A method of operating a file system comprising:
   receiving write data to be stored in a memory device including a plurality of memory dies;
   generating a log of the write data based on a property of the write data; and
   allocating a section group and a section to the write data based on the log of the write data,
   wherein the section group is an indicator used by a controller of the memory device to determine a superblock included in the memory device in which the write data is to be stored, and
   wherein the section is an indicator used by the controller to determine a physical zone in which the write data is to be stored among a plurality of physical zones included in the superblock.

10. The method of operating the file system of claim 9, wherein the log of the write data is determined based on a type and a temperature of the write data.

11. The method of operating the file system of claim 9, wherein a first section corresponding to a first physical zone is included in a first section group in which an empty section in the next order according to a section order in the first section group is allocated as a new section for the write data.

12. The method of operating the file system of claim 11, wherein a second section corresponding to a second physical zone is included in a second section group in which any one of empty sections in the second section group is allocated as a new section for the write data, regardless of a section order in the second section group.

13. The method of operating the file system of claim 12, wherein whether the section is the first section or the second section is determined based on a size and an input/output frequency of the write data.

* * * * *